United States Patent
Dani et al.

(10) Patent No.: US 11,005,192 B2
(45) Date of Patent: May 11, 2021

(54) INTELLIGENT METAMATERIAL RADAR HAVING A DYNAMICALLY CONTROLLABLE ANTENNA

(71) Applicant: Metawave Corporation, Palo Alot, CA (US)

(72) Inventors: Asmita Dani, Palo Alto, CA (US);
Chiara Pelletti, Palo Alto, CA (US);
Yan Wang, Palo Alto, CA (US);
George Daniel, Palo Alto, CA (US);
Maha Achour, Palo Alto, CA (US)

(73) Assignee: METAWAVE CORPORATION, Carlsbad, CA (US)

( * ) Notice: Subject to any disclaimer, the term of this patent is extended or adjusted under 35 U.S.C. 154(b) by 174 days.

(21) Appl. No.: 15/997,579

(22) Filed: Jun. 4, 2018

(65) Prior Publication Data
US 2019/0131721 A1    May 2, 2019

Related U.S. Application Data

(60) Provisional application No. 62/515,045, filed on Jun. 5, 2017, provisional application No. 62/660,216, filed on Apr. 19, 2018.

(30) Foreign Application Priority Data

May 1, 2018    (WO) ................ PCT/US2018/030541

(51) Int. Cl.
*H01Q 21/24*    (2006.01)
*G01S 13/931*    (2020.01)
(Continued)

(52) U.S. Cl.
CPC ............. *H01Q 21/24* (2013.01); *G01S 7/032* (2013.01); *G01S 13/726* (2013.01);
(Continued)

(58) Field of Classification Search
CPC ........ H01Q 21/24; H01Q 3/36; H01Q 15/002; H01Q 19/062; H01Q 21/064; H01P 1/184
(Continued)

(56) References Cited

U.S. PATENT DOCUMENTS 6,492,949 B1    12/2002  Breglia et al.
6,768,453 B2    7/2004   Solbach
(Continued)

FOREIGN PATENT DOCUMENTS

| CN | 102365789 A | 2/2012 |
|---|---|---|
| JP | 2016-20899 A | 2/2016 |
| KR | 101527771 B1 | 6/2015 |

OTHER PUBLICATIONS

Koch, R. et al. "Detection and Purging of Specular Reflective and Transparent Object Influences in 3D Range Measurements," ISPRS—International Archives of the Photogrammetry, Remote Sensing and Spatial Information Sciences, vol. XLII-2/W3, 2017, pp. 377-384.
(Continued)

*Primary Examiner* — Bo Fan
(74) *Attorney, Agent, or Firm* — Haynes and Boone, LLP

(57) ABSTRACT

Examples disclosed herein relate to an intelligent metamaterial radar. The radar has an Intelligent Metamaterial ("iMTM") antenna module to radiate a transmission signal with a dynamically controllable iMTM antenna in a plurality of directions based on a controlled reactance and generate radar data capturing a surrounding environment. The radar also has an iMTM interface module to detect and identify a target in the surrounding environment from the radar data and to control the iMTM antenna module.

19 Claims, 22 Drawing Sheets

(51) Int. Cl.
*G01S 13/72* (2006.01)
*H01Q 3/36* (2006.01)
*H01Q 15/00* (2006.01)
*H01Q 19/06* (2006.01)
*H01Q 21/06* (2006.01)
*H01P 1/18* (2006.01)
*G01S 7/03* (2006.01)
*G08G 1/14* (2006.01)
*H01Q 3/44* (2006.01)
*H01Q 21/00* (2006.01)
*G01S 13/34* (2006.01)
*G01S 13/58* (2006.01)

(52) U.S. Cl.
CPC .............. *G01S 13/931* (2013.01); *G08G 1/14* (2013.01); *H01P 1/184* (2013.01); *H01Q 3/36* (2013.01); *H01Q 3/44* (2013.01); *H01Q 15/002* (2013.01); *H01Q 19/062* (2013.01); *H01Q 21/005* (2013.01); *H01Q 21/064* (2013.01); *G01S 13/34* (2013.01); *G01S 13/584* (2013.01)

(58) Field of Classification Search
USPC .......................................................... 342/81
See application file for complete search history.

(56) References Cited

U.S. PATENT DOCUMENTS

| | | | | |
|---|---|---|---|---|
| 7,250,908 | B2* | 7/2007 | Lee ................... | H01Q 21/0075 |
| | | | | 343/700 MS |
| 8,633,866 | B2 | 1/2014 | Sarabandi et al. | |
| 8,754,810 | B2 | 6/2014 | Guo et al. | |
| 9,545,923 | B2* | 1/2017 | Casse ................ | B60W 30/14 |
| 9,559,428 | B1* | 1/2017 | Jensen ............... | H01Q 13/06 |
| 9,786,986 | B2 | 10/2017 | Johnson et al. | |
| 2008/0079649 | A1* | 4/2008 | Mohamadi ........... | H01L 23/66 |
| | | | | 343/853 |
| 2016/0011307 | A1 | 1/2016 | Casse et al. | |
| 2016/0013531 | A1* | 1/2016 | Casse ................. | H01P 1/184 |
| | | | | 333/161 |
| 2016/0061935 | A1 | 3/2016 | McCloskey et al. | |
| 2016/0134022 | A1 | 5/2016 | Alexopoulos et al. | |
| 2016/0233588 | A1 | 8/2016 | Bily et al. | |

OTHER PUBLICATIONS

Mhih, V. et al. "Human-level control through deep reinforcement learning," Nature 518, pp. 529-533, Feb. 2015.

Limberger, F. et al. "Real-Time Detection of Planar Regions in Unorganized Point Clouds," Pattern Recognition, 48(6), pp. 2043-2053, Jun. 2015.

Seyfioglu, M. S., et al. "Deep Convolutional Autoencoder for Radar-Based Classification of Similar Aided and Unaided Human Activities," IEEE Transactions on Aerospace and Electronic Systems, vol. 54, issue 4, pp. 1709-1723, Aug. 2018.

Zhou, Y. et al. "VoxelNet: End-to-End Learning for Point Cloud Based 3D Object Detection," arXiv: 1711.06396 [cs.CV], p. 1-10, Nov. 2017.

Guzman-Quiros, Raul et al. "Advances in Electronically Reconfigurable LWAs in Fabry-Pérot and SIW Technologies", 7th European Conference on Antennas and Propagation, EuCAP 2013. 2001-2005.

Wang, Yifu et al. "Tunable I-shaped metamaterial by loading varactor diode for reconfigurable antenna", Applied Physics A, May 26, 2011, 1243-1247.

Zhang, Miao et al. "Design of a Double-Layer Slotted Waveguide Array with a Partially Corporate Feed Circuit Installed in the Bottom Layer and its Fabrication by Diffusion Bonding of Laminated Thin Plates in 38GHz Band" The 2009 International Symposium on Antennas and Propogation, ISAP 2009, Oct. 20-23. 373-376.

* cited by examiner

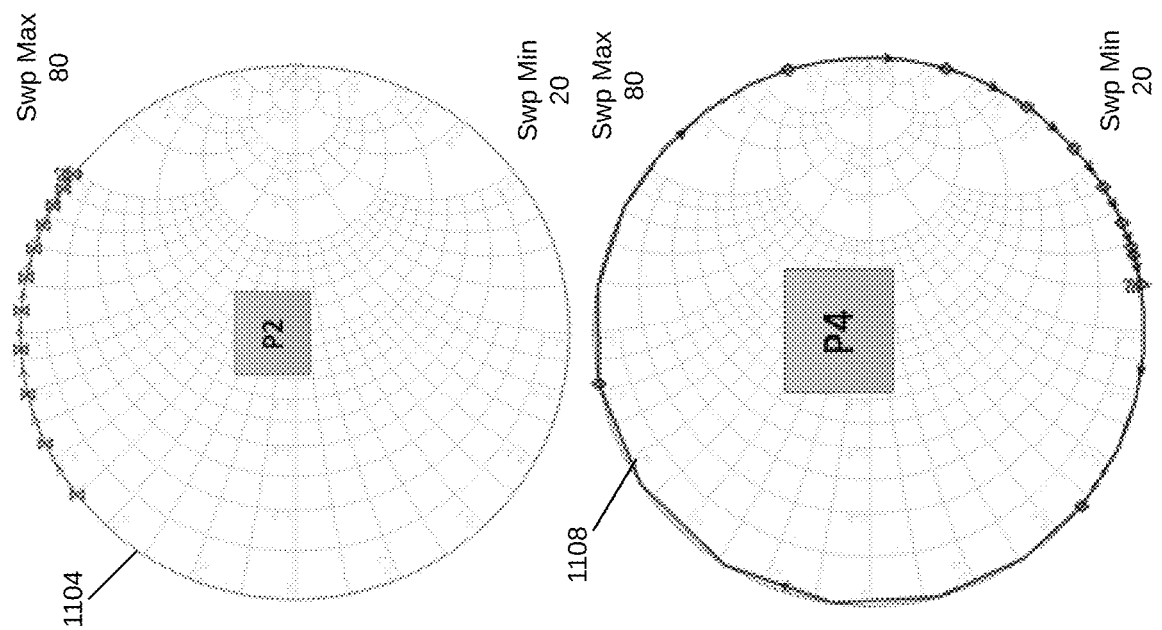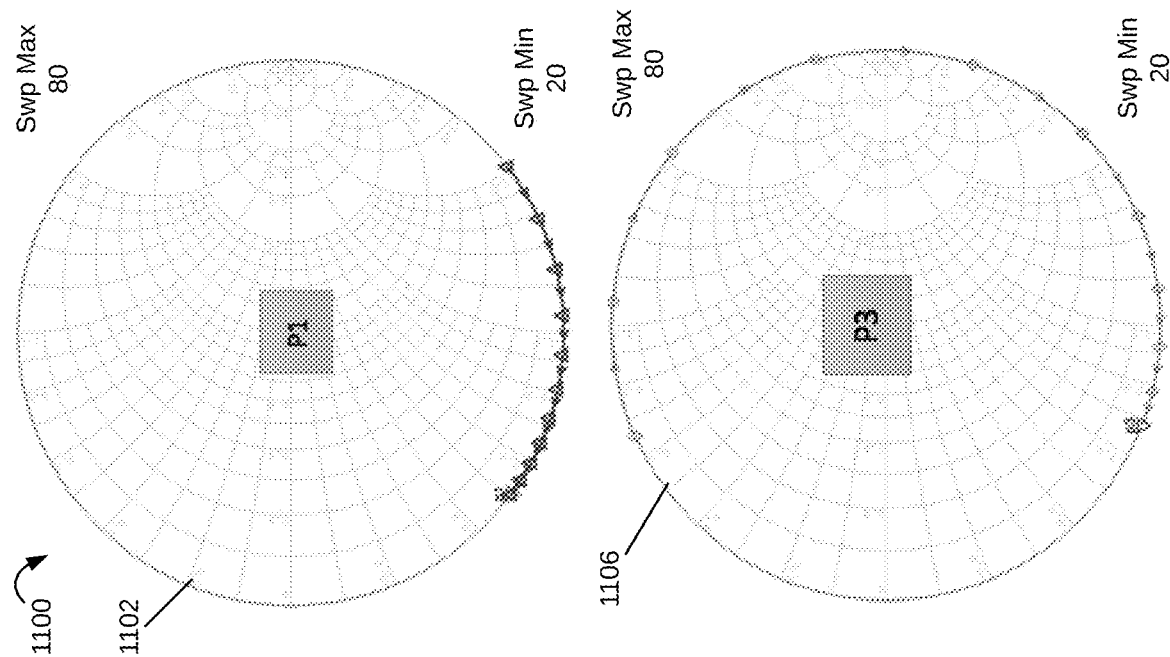
FIG. 11

THREE LAYER, PROBE FED MTM ANTENNA STRUCTURE

TWO LAYER, PROBE FED MTM ANTENNA STRUCTURE

INTELLIGENT METAMATERIAL RADAR HAVING A DYNAMICALLY CONTROLLABLE ANTENNA

CROSS-REFERENCE TO RELATED APPLICATIONS

This application claims priority to PCT Application No. PCT/US18/30541, filed on May 1, 2018, which itself claims priority to U.S. Provisional Application No. 62/515,045, filed on Jun. 5, 2017. This application also claims priority to U.S. Provisional Application No. 62/660,216, filed on Apr. 19, 2018. These applications are incorporated herein by reference.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, in which like reference characters refer to like parts throughout, and in which:

FIG. 11 shows the Smith charts at each reference plane illustrated in the distributed varactor network of FIG. 10;

DETAILED DESCRIPTION

Figure 1:
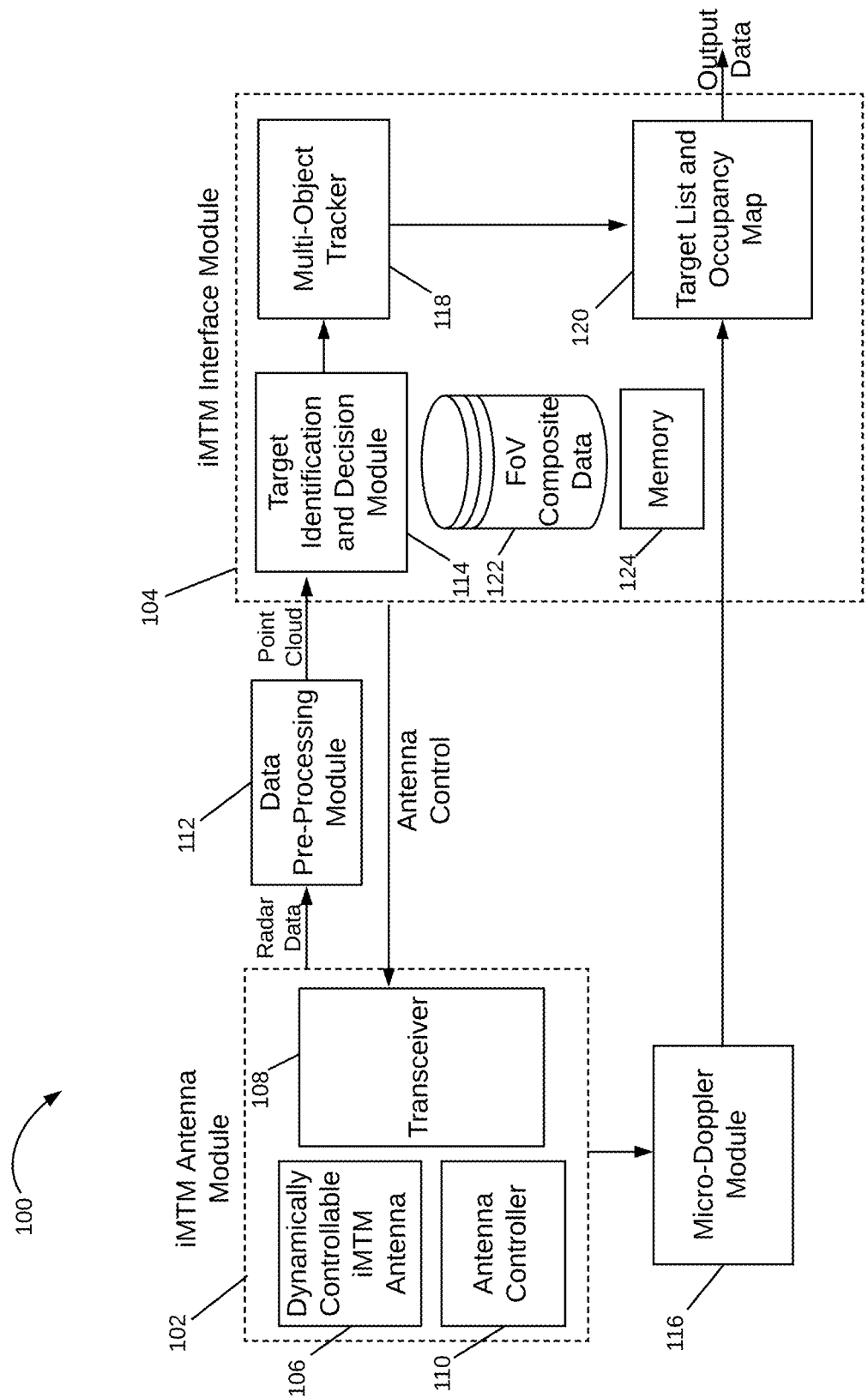
FIG. 1 illustrates a schematic diagram of an iMTM radar system for use in an autonomous driving system in accordance with various examples.

Systems and methods for an Intelligent Metamaterial ("iMTM") radar having a dynamically controllable antenna are disclosed. The systems and methods are suitable for many different applications and can be deployed in a variety of different environments and configurations. In various examples, the systems and methods are used in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on.

The iMTM radar is a "digital eye" with true 3D vision and capable of a human-like interpretation of the world. The digital eye and human-like interpretation capabilities are provided by two main modules: an iMTM Antenna Module and an iMTM Interface Module. The iMTM antenna module has one or more dynamically controllable antennas with an iMTM array capable of providing a 360° view of a vehicle's path and surrounding environment. The iMTM interface module receives data from the iMTM antenna module corresponding to a Field of View ("FoV") and is trained to detect and identify targets thereon. The iMTM interface module can also control the iMTM antenna module as desired.

In various examples, the dynamic control of the iMTM antenna module may involve reactance control to change the electrical or electromagnetic configuration of the iMTM array. This may be accomplished, for example, with the use of varactors to enable adjustment of radiation patterns from the iMTM array in the iMTM antenna module. Each iMTM array is an array of individual cells including intelligent metamaterial cells ("iMTM cells"). In various examples, the iMTM cells may be configured into subarrays that have specific characteristics.

For use in an autonomous driving vehicle, the iMTM radar system may perform a coarse focus with a large beam width as an ambient condition, and then narrow the beam width when an echo is received, indicating a target is within the FoV of the radiation patterns. In this way, the larger beam width may sweep the full FoV of the iMTM antenna module, reducing the time to scan the FoV. In some examples, the iMTM interface module is able to detect the area of the FoV showing a target and map that to a specific configuration of iMTM cells and/or subarrays to focus a beam, i.e., narrow the beam width. Additionally, in some examples, the specific dimensions and other properties of a detected target, such as traveling velocity with respect to the antenna structure, are analyzed and a next action(s) or course of action(s) is determined. The detected target in some examples is then provided as a visual or graphic display, which may act as a back-up security feature for a passenger in the autonomous driving vehicle.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

FIG. 1 illustrates a schematic diagram of an iMTM radar system for use in an autonomous driving system in accordance with various examples. iMTM radar system 100 is a "digital eye" with true 3D vision and capable of a human-like interpretation of the world. The "digital eye" and human-like interpretation capabilities are provided by two main modules: iMTM Antenna Module 102 and iMTM Interface Module 104.

iMTM antenna module 102 has a Dynamically Controllable iMTM ("DCiMTM") antenna 106 to radiate dynamically controllable and highly-directive RF beams using metamaterials. A transceiver module 108 coupled to the DCiMTM antenna 106 prepares a signal for transmission, such as a signal for a radar device, wherein the signal is defined by modulation and frequency. The signal is provided to the DCiMTM antenna 106 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 110, such as at the direction of iMTM interface module 104.

The RF beams reflect off of targets in the vehicle's path and surrounding environment and the RF reflections are received by the transceiver module 108. Radar data from the received RF beams is provided to the iMTM interface module 104 for target detection and identification. A data pre-processing module 112 processes the radar data to encode it into a point cloud for the iMTM interface module 104. In various examples, the data pre-processing module 112 could be a part of the iMTM antenna module 102 or the iMTM interface module 104, such as on the same circuit board as the other modules within the iMTM antenna or interface modules 102-104. The radar data may be organized in sets of Range-Doppler ("RD") map information, corresponding to 4D information that is determined by each RF beam radiated off of targets, such as azimuthal angles, elevation angles, range, and velocity. The RD maps may be extracted from Frequency-Modulated Continuous Wave ("FMCW") radar pulses and contain both noise and systematic artifacts from Fourier analysis of the pulses. The iMTM interface module 104 controls further operation of the iMTM antenna module 102 by, for example, providing beam parameters for the next RF beams to be radiated from the iMTM cells in the iMTM antenna structure 106.

In operation, the antenna controller 110 is responsible for directing the DCiMTM antenna 106 to generate RF beams with determined parameters such as beam width, transmit angle, and so on. The antenna controller 110 may, for example, determine the parameters at the direction of iMTM interface module 104, which may at any given time want to focus on a specific area of an FoV upon identifying targets of interest in the vehicle's path or surrounding environment. The antenna controller 110 determines the direction, power, and other parameters of the beams and controls the DCiMTM antenna 106 to achieve beam steering in various directions. The antenna controller 110 also determines a voltage matrix to apply to reactance control mechanisms coupled to the DCiMTM antenna 106 to achieve a given phase shift. In some examples, the DCiMTM antenna 106 is adapted to transmit a directional beam through active control of the reactance parameters of the individual iMTM cells that make up the DCiMTM antenna 106. iMTM interface module 104 provides control actions to the antenna controller 110 at the direction of the Target Identification and Decision Module 114.

Next, the DCiMTM antenna 106 radiates RF beams having the determined parameters. The RF beams are reflected off of targets in and around the vehicle's path (e.g., in a 360° field of view) and are received by the transceiver module 108 in iMTM antenna module 102. The iMTM antenna module 102 transmits the received 4D radar data to the data pre-processing module 112 for generating a point cloud that is then sent to the iMTM interface module 104. A micro-doppler module 116 coupled to the iMTM antenna module 102 and the iMTM interface module 104 extracts micro-doppler signals from the 4D radar data to aid in the identification of targets by the iMTM interface module 104. The micro-doppler module 116 takes a series of RD maps from the iMTM antenna module 102 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, it is possible to determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 116 could be a part of the iMTM antenna module 102 or the iMTM interface module 104, such as on the same circuit board as the other modules within the DCiMTM antenna 106 or interface modules 102-04.

The target identification and decision module 114 receives the point cloud from the data pre-processing module 112, processes the point cloud to detect and identify targets, and determines the control actions to be performed by the iMTM antenna module 102 based on the detection and identification of such targets. For example, the target identification and decision module 114 may detect a cyclist on the path of the vehicle and direct the iMTM antenna module 102, at the instruction of its antenna controller 110, to focus additional RF beams at a given phase shift and direction within the portion of the FoV corresponding to the cyclist's location.

The iMTM interface module 104 may also include a multi-object tracker 118 to track the identified targets over time, such as, for example, with the use of a Kalman filter. The multi-object tracker 118 matches candidate targets identified by the target identification and decision module 114 with targets it has detected in previous time windows. By combining information from previous measurements, expected measurement uncertainties, and some physical knowledge, the multi-object tracker 118 generates robust, accurate estimates of target locations.

Information on identified targets over time are then stored at a Target List and Occupancy Map 120, which keeps tracks of targets' locations and their movement over time as determined by the multi-object tracker 118. The tracking information provided by the multi-object tracker 118 and the micro-doppler signal provided by the micro-doppler module 116 are combined to produce an output containing the type/class of target identified, their location, their velocity, and so on. This information from iMTM radar system 100 is then sent to a sensor fusion module (described in more detail below with reference to FIG. 16) in the vehicle, where it is processed together with information from other sensors in the vehicle.

In various examples, an FoV composite data unit 122 stores information that describes an FoV. This may be historical data used to track trends and anticipate behaviors and traffic conditions or may be instantaneous or real-time data that describes the FoV at a moment in time or over a window in time. The ability to store this data enables the iMTM interface module 104 to make decisions that are strategically targeted at a particular point or area within the FoV. For example, the FoV may be clear (no echoes received) for five minutes, and then one echo arrives from a specific region in the FoV; this is similar to detecting the front of a car. In response, the iMTM interface module 104 may determine to narrow the beam width for a more focused view of that sector or area in the FoV. The next scan may indicate the targets' length or other dimension, and if the target is a car, the iMTM interface module 104 may consider what direction the target is moving and focus the beams on that area. Similarly, the echo may be from a spurious target, such as a bird, which is small and moving quickly out of the path of the car. There are a variety of other uses for the FoV composite data 122, including the ability to identify a specific type of target based on previous detection. A memory 124 stores useful data for iMTM radar system 100, such as, for example, information on which subarrays of the DCiMTM antenna 106 perform better under different conditions.

In various examples described herein, the use of iMTM radar system 100 in an autonomous driving vehicle provides a reliable way to detect targets in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the iMTM radar system 100, the driver (or driverless vehicle) may maintain the maximum safe speed without regard to the weather conditions. Even if other drivers slow down, a vehicle enabled with the iMTM radar system 100 will be able to detect those slow-moving vehicles and obstacles in the way and avoid/navigate around them.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the iMTM interface module 104 adjusts the focus of the beam to a larger beam width, thereby enabling a faster scan of areas where there are few echoes. The iMTM interface module 104 may detect this situation by evaluating the number of echoes received within a given time period and making beam size adjustments accordingly. Once a target is detected, the iMTM interface module 104 determines how to adjust the beam focus. This is achieved by changing the specific configurations and conditions of the DCiMTM antenna 106. In one example scenario, the voltages on the varactors are adjusted. In another example scenario, a subset of iMTM unit cells is configured as a subarray. This configuration means that this set may be treated as a single unit, and all the varactors are adjusted similarly. In another scenario, the subarray is changed to include a different number of unit cells, where the combination of iMTM unit cells in a subarray may be changed dynamically to adjust to conditions and operation of the iMTM radar system 100.

All of these detection scenarios, analysis and reactions may be stored in the iMTM interface module 104 and used for later analysis or simplified reactions. For example, if there is an increase in the echoes received at a given time of day or on a specific highway, that information is fed into the antenna controller 110 to assist in proactive preparation and configuration of the DCiMTM antenna 106. Additionally, there may be some subarray combinations that perform better, such as to achieve a desired result, and this is stored in the memory 124.

Figure 2:
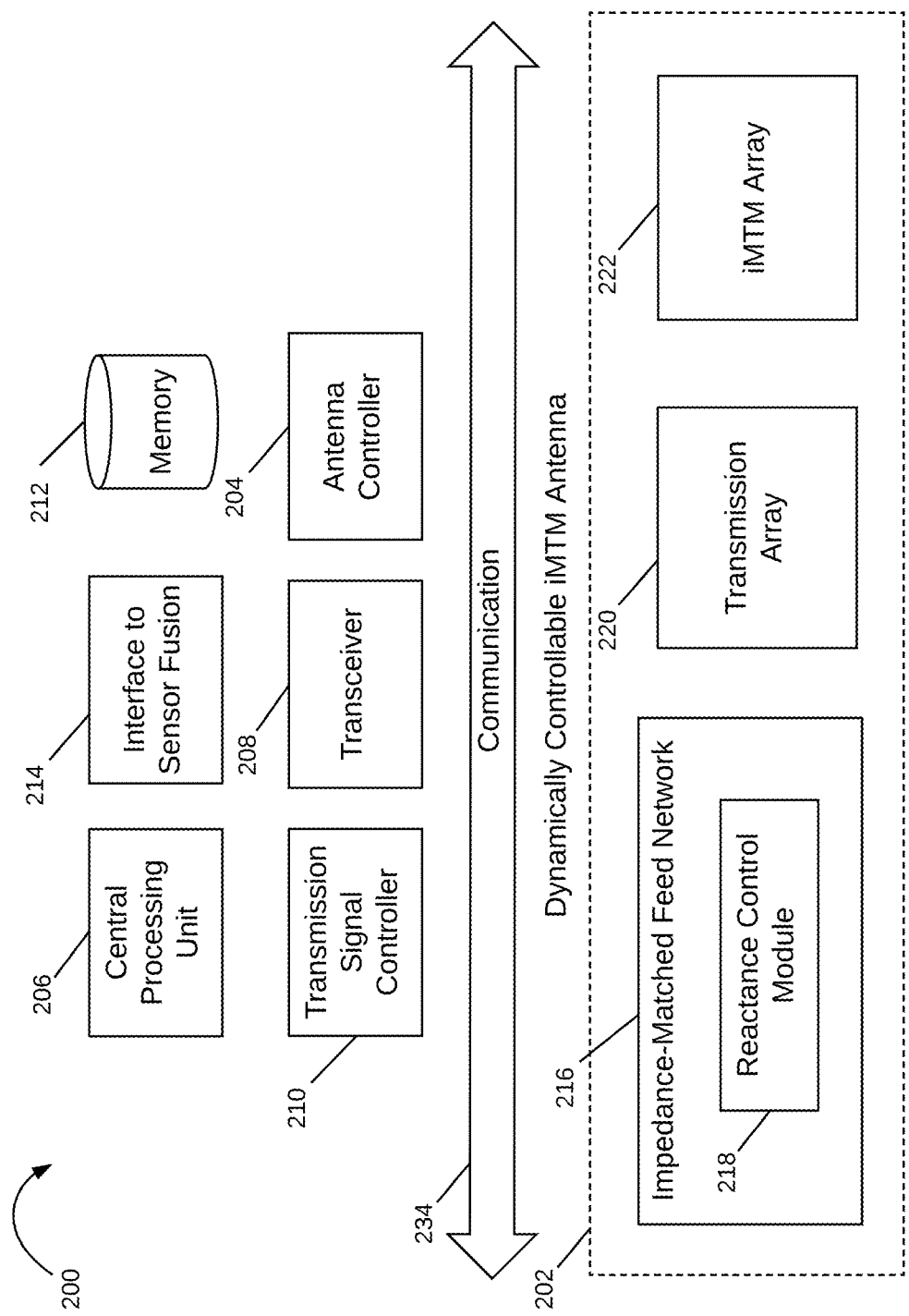
FIG. 2 is a schematic diagram of an iMTM antenna module for use with the iMTM radar system of FIG. 1 in accordance with various examples.

Attention is now directed at FIG. 2, which shows a schematic diagram of an iMTM antenna module for use with the iMTM radar system of FIG. 1 in accordance with various examples. iMTM antenna module 200 has an DCiMTM antenna 202 coupled to an antenna controller 204, a central processor 206, and a transceiver 208. A transmission signal controller 210 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 210 may also generate a cellular modulated signal, such as an Orthogonal Frequency Division Multiplexed ("OFDM") signal. In some examples, the signal is provided to the iMTM antenna module 200 and the transmission signal controller 210 may act as an interface, translator or modulation controller, or otherwise as required for the signal to propagate through a transmission line system. The received information is stored in a memory storage unit 212, wherein the information structure may be determined by the type or transmission and modulation pattern.

The DCiMTM antenna 202 radiates the signal to a radiating array of iMTM cells in the iMTM array 222. In various examples, the DCiMTM antenna 202 includes an impedance-matched feed network 216, having a reactance control module 218. The reactance control module 218 includes a reactance control mechanism controlled by antenna controller 204, which may be used to control the phase of a radiating signal from radiating array structures, such as iMTM array 222.

Note that as illustrated, there is one DCiMTM antenna 202 in iMTM antenna module 200. However, an iMTM antenna module 200 may have multiple DCiMTM antennas in any given configuration. A set of DCiMTM antennas may be designated as transmit antennas, and another set may be designated as receive antennas. Further, a DCiMTM antenna may be orthogonal from another. Different DCiMTM antennas may also have different polarizations. In various examples, different DCiMTM antennas may be configured to detect different targets, e.g., a set of antennas may be configured to enhance the detection and identification of pedestrians, another set of antennas may be configured to enhance the detection and identification of vehicles, and so forth. In the case of pedestrians, the configuration of the antennas may include power amplifiers to adjust the power of a transmitted signal and/or different polarization modes for different arrays to enhance pedestrian detection. It is appreciated that numerous configurations of DCiMTM antennas may be implemented in a given iMTM antenna module.

In operation, the antenna controller 204 receives information from other modules in iMTM antenna module 200 and/or from iMTM interface module 104 in FIG. 1 indicating a next radiation beam, wherein a radiation beam may be specified by parameters such as beam width, transmit angle, transmit direction and so forth. The antenna controller 204 determines a voltage matrix to apply to the reactance control module 218 in DCiMTM antenna 202 to achieve a given phase shift or other parameters. In these examples, the DCiMTM antenna 202 is adapted to transmit a directional beam without using digital beam forming methods, but rather through active control of the reactance parameters of the individual iMTM cells that make up the iMTM array 222.

Transceiver 208 prepares a signal for transmission, such as a signal for a radar device, wherein the signal is defined by modulation and frequency. The signal is received by the DCiMTM antenna 202 and the phase of the iMTM cells in the iMTM array 222 is adjusted at the direction of the antenna controller 204. In some examples, transmission signals are received by a portion, or subarray(s), of the iMTM array 222. The iMTM array 222 can be implemented in many applications, including radar, cellular antennas, and autonomous vehicles to detect and identify targets in the path of or surrounding the vehicle. Alternate examples may use the iMTM array 222 for wireless communications, medical equipment, sensing, monitoring, and so forth. Each application type incorporates designs and configurations of the elements, structures and modules described herein to accommodate their needs and goals.

In iMTM antenna module 200, a signal is specified by antenna controller 204, which may be at the direction of an iMTM interface module (e.g., iMTM interface module 104 in FIG. 1), a sensor fusion module (described below with reference to FIG. 16) via interface to sensor fusion 214, or it may be based on program information from memory storage 212. There are a variety of considerations to determine the beam formation, wherein this information is provided to antenna controller 204 to configure the various elements of the iMTM array 222, which are described herein. The transmission signal controller 210 generates the transmission signal and provides it to the DCiMTM antenna 202, such as through a coaxial cable or other connector. The signal propagates through the impedance-matched feed network 216 to the transmission array 220 and iMTM array 222 for transmission through the air.

The impedance-matched feed network 216 includes impedance matching mechanisms and a reactance control module 218 for respectively matching input signal parameters with the iMTM cells in iMTM array 222 and providing phase shift control to each cell. The impedance matching mechanisms may include a directional coupler having an input port to each of adjacent transmission lines in the feed network 216. The adjacent transmission lines in feed network 216 may form a super element, wherein an adjacent transmission line pair has a specific phase difference, such as a 90° phase difference with respect to each other.

The impedance matching mechanisms work in coordination with the reactance control module 218 to provide phase shifting of the radiating signal(s) from the iMTM array 222. In various examples, the reactance control module 218 includes a reactance control mechanism controlled by antenna controller 204, which may be used to control the phase of a radiating signal from the iMTM cells in the iMTM array 222 and to adjust the effective reactance of a transmission line and/or a cell fed by a transmission line in the feed network 216. The reactance control module 218 may, for example, include a varactor, a varactor network, a phase shift network, or any other mechanism capable of providing a desired phase shift up to 360° in each iMTM cell. The phase shift network system may include multiple varactors to achieve the desired phase shift.

One or more reactance control mechanisms may be placed within a transmission line in the feed network 216. Similarly, reactance control mechanisms may be placed within multiple transmission lines or within each iMTM radiating cell to achieve a desired result. The reactance control mechanisms may have individual controls or may have a common control. In some examples, a modification to a first reactance control mechanism is a function of a modification to a second reactance control mechanism. Further, the reactance control module 218 may be positioned within the architecture of feed network 216; one or both may be external to the feed network 216 for manufacture or composition as an antenna or radar module.

Figure 3:
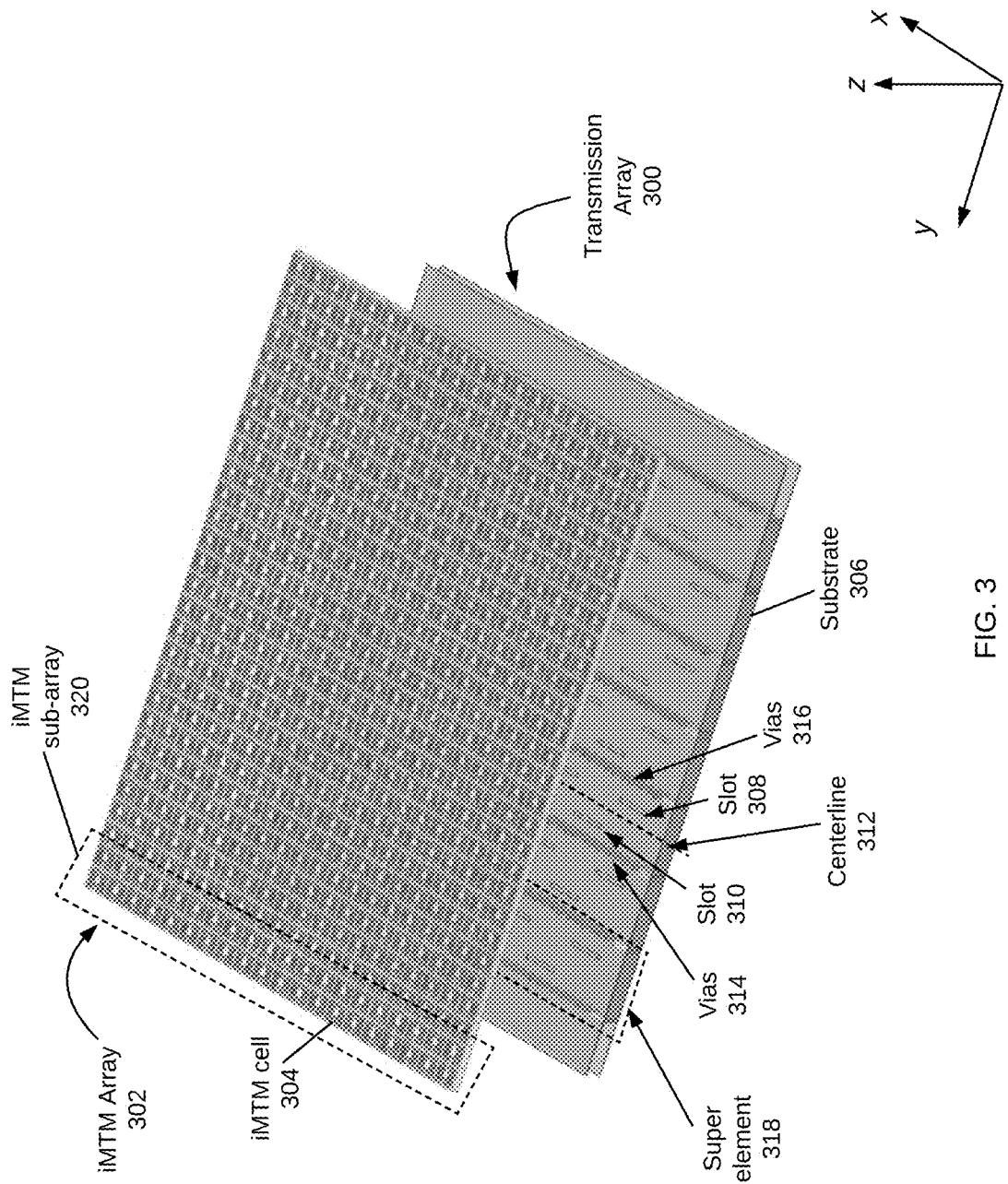
FIG. 3 is a schematic diagram of a transmission array and an iMTM array for use in the DCiMTM antenna of FIG. 2 in accordance with various examples.

Attention is now directed to FIG. 3, which illustrates a schematic diagram of a transmission array 300 and an iMTM array 302 for use in the DCiMTM antenna of FIG. 2 in accordance with various examples. The iMTM array 302 is composed of individual iMTM cells, such as iMTM cell 304. The iMTM array 302 may take a variety of forms and is designed to operate in coordination with the transmission array 300. The iMTM array 302 may also operate as a single array or may be controlled to operate as multiple subarrays, wherein each of the array or subarrays acts to generate a radiation beamform that is steerable through control of the reactance of individual iMTM unit cells. In various examples, the transmission signals sent by the transceiver 208 of FIG. 2 are received by a portion, or subarray, of iMTM array 302, such as iMTM subarray 320. The iMTM array 302 is an array of individual iMTM radiating cells (e.g., an 8×16 array), wherein each of the iMTM cells has a uniform size and shape; however, some examples may incorporate different sizes, shapes, configurations and array sizes.

The transmission array 300 includes a substrate 306 having multiple conductive layers and a dielectric layer sandwiched therebetween. In various examples, the transmission array 300 is configured as super elements that are along the x-direction of the iMTM array 302, wherein each super element includes a plurality of slots or discontinuities (e.g., slots 308-310) in the conductive layer proximate the iMTM cells in iMTM array 302. A signal is provided to each of the super elements that radiates through the slots in the super elements and feeds the iMTM cells in iMTM array 302. The various super elements may be fed with signals of different phase, thus providing phase shifting in the y-direction, while the iMTM array 302 may be controlled so as to shift the phase of the transmission signal in the y-direction and/or the x-direction, wherein the signal transmits in the z-direction. The ability to control the directivity and phase of the transmission signal provides flexibility and responsive behavior for wireless communications and radar applications.

The transmission array 300 may be referred to as a type of a Slotted Waveguide Antenna ("SWA") and may include passive or active components (not shown) for matching phase control, amplitude tampering, and other RF enhancement functionalities. The distances between the iMTM unit cells in iMTM array 302 can be much lower than half the wavelength of the radiating frequency of the transmission signal. Active and passive components may be placed on the iMTM cells with control signals either routed internally through the super elements or externally through or on upper portions of the transmission array 300. Alternate configurations may reconfigure and/or modify the arrays 300-302 to improve radiation patterns, bandwidth, side lobe levels, and so forth.

The antenna performance may be adjusted by design of the transmission array 300 features and materials, such as the shape of the slots, slot patterns, slot dimensions, conductive trace materials and patterns, as well as other modifications to achieve impedance matching and so forth. The substrate/feed 306 has two portions of dielectric separated by a slotted transmission line positioned therebetween. The slotted transmission line sits on substrate 306, wherein each transmission line is within a bounded area; the boundary is a line of vias (e.g., vias 314-316) cut through the conductive layer. The slots are configured within the conductive layer, where in the illustrated example the slots 308-10 are positioned symmetrically with respect to the center line 312. For clarity of understanding, FIG. 3 illustrates the slots as equidistant from center line 312, where the slots 308-10 are on opposite sides of the centerline 312 and staggered along the direction thereof. A small portion super element 318 is illustrated in the transmission array 300.

Figure 4:
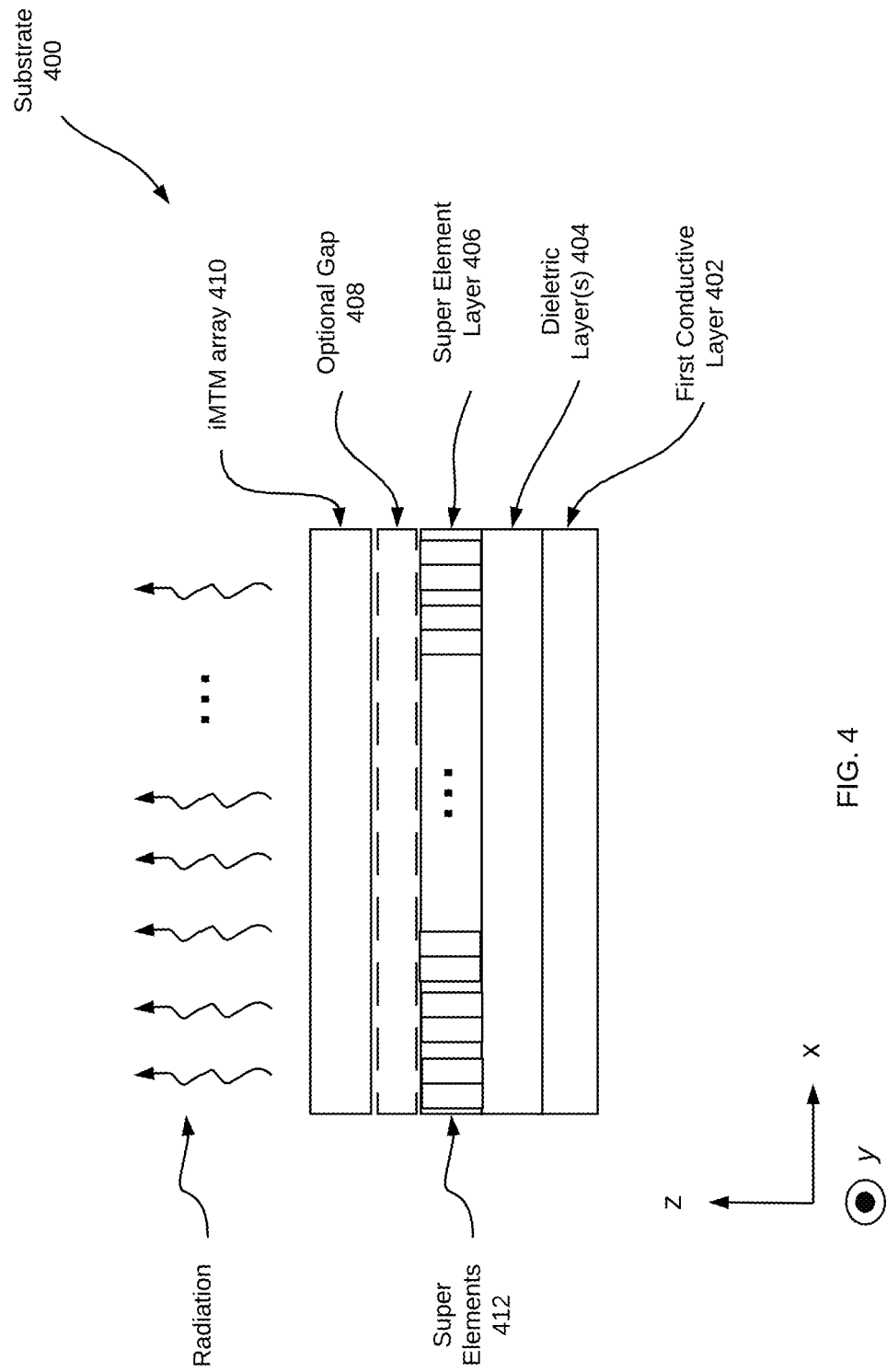
FIG. 4 is another perspective of the transmission array and iMTM array of FIG. 3 illustrating their various layers in accordance with various examples.

FIG. 4 is another perspective of the transmission array 300 and iMTM array 302 of FIG. 3 illustrating their layers in accordance with various examples. Substrate 400 includes a first conductive layer 402, a dielectric layer(s) 404, and a super element layer 406. The super elements are formed by conductive and non-conductive traces on a top portion of the super element layer 406 and by vias formed through the super element layer 406 and through the dielectric layer(s) 404. The vias (not shown) are lined with conductive material, or may be filled with conductive material, so as to form channels defining the super elements 412 and providing a wave guide function to maintain propagation of the signals fed into the super elements 412. An optional gap 408 may be placed between the super element layer 406 and the iMTM array 410, which contains the iMTM cells. The longitudinal direction of the super elements 412 in the perspective of FIG. 4 is into the page, in the y-direction, with the signal radiating in the z-direction. Again, note these directions are for illustration and description purposes only and do not necessarily correlate to absolute references. Note also that the substrate 400 may be part of a DCiMTM antenna in a sensor fusion module (e.g., sensor fusion module 1620 of FIG. 16 within the vehicle or infrastructure, whereby different locations share information and communicate with each other to provide information ahead of action, such as to identify a speeding car several blocks before it actually is in range of a given sensor. One or multiple sensors may provide alerts to other sensors in the environment to be on the look-out for a speeder.

Figure 5:
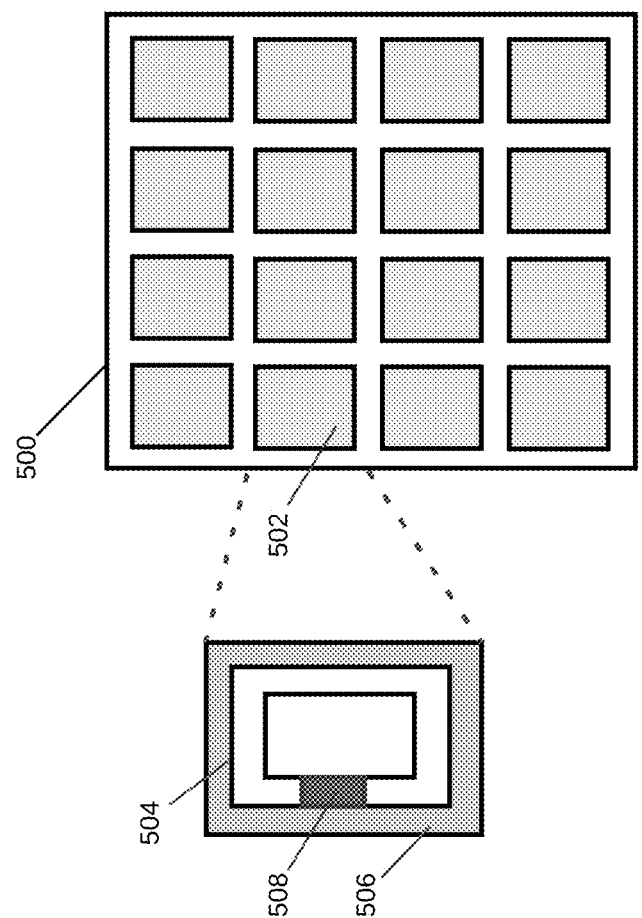
FIG. 5 is a schematic diagram of an iMTM array of iMTM cells in accordance with various examples.

FIG. 5 illustrates an iMTM array of iMTM cells in accordance with various examples. iMTM array 500 contains multiple iMTM cells positioned in one or more layers of a substrate and coupled to other circuits, modules and layers, as desired and depending on the application. iMTM cell 502 is illustrated having a conductive outer portion or loop 504 surrounding a conductive area 506 with a space in between. Each iMTM cell 502 may be configured on a dielectric layer, with the conductive areas and loops provided around and between different iMTM cells. A voltage controlled variable reactance device 508, e.g., a varactor, provides a controlled reactance between the conductive area 506 and the conductive loop 504. The controlled reactance is controlled by an applied voltage, such as an applied reverse bias voltage in the case of a varactor. The change in reactance changes the behavior of the iMTM cell 502, enabling the iMTM array 500 to provide focused, high gain beams directed to a specific location. It is appreciated that additional circuits, modules and layers may be integrated with the iMTM array 500.

As generally described herein, an iMTM cell such as cell 502 is an artificially structured element used to control and manipulate physical phenomena, such as the electromagnetic ("EM") properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. An iMTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an iMTM cell radiates according to its configuration. Changes to the reactance parameters of the iMTM cell result in changes to its radiation pattern. Where the radiation pattern is changed to achieve a phase change or phase shift, the resultant structure is a powerful antenna or radar, as small changes to the iMTM cell can result in large changes to the beamform.

The iMTM cells include a variety of conductive structures and patterns, such that a received transmission signal is radiated therefrom. In various examples, each iMTM cell has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 6:
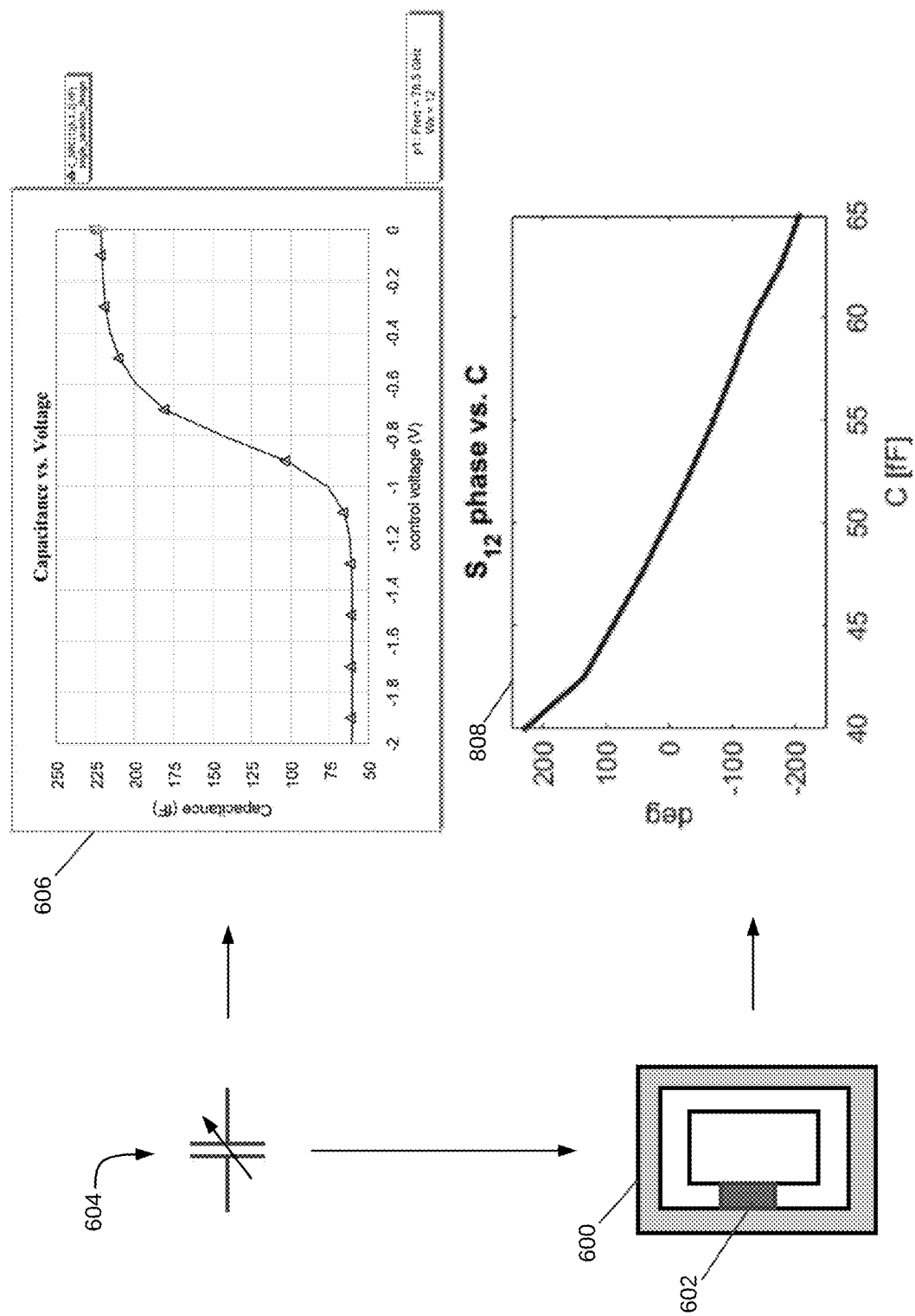
FIG. 6 is a schematic diagram of an iMTM cell and a varactor for reactance control in the iMTM cell in accordance with various examples.

In various examples, control of beam form and direction in an iMTM cell may be achieved by a voltage controlled variable reactance device in each iMTM cell. FIG. 6 illustrates an iMTM cell and a varactor for reactance control in the iMTM cell in accordance with various examples. An iMTM cell 600, similar to iMTM cell 502 of FIG. 5, has a reactance control device 602 to provide reactance control in the iMTM cell. The reactance control device 602 may be, for example, a varactor such as varactor 604. Varactor 604 has a reactance that is controlled by an applied voltage, e.g., an applied reverse bias voltage. Graph 606 illustrates how the varactor 604's capacitance changes with the applied voltage. The change in reactance of varactor 604 changes the behavior of the iMTM cell 600, enabling the iMTM array to provide focused, high gain beams directed to a specific location. Each beam may be directed to have a phase that varies with the reactance of the varactor, as shown in graph 608 illustrating the change in phase with the change in reactance of varactor 602. With the application of a control voltage to the varactor 602, the iMTM cell 600 is able to generate beams at any direction about a plane.

Figure 7:
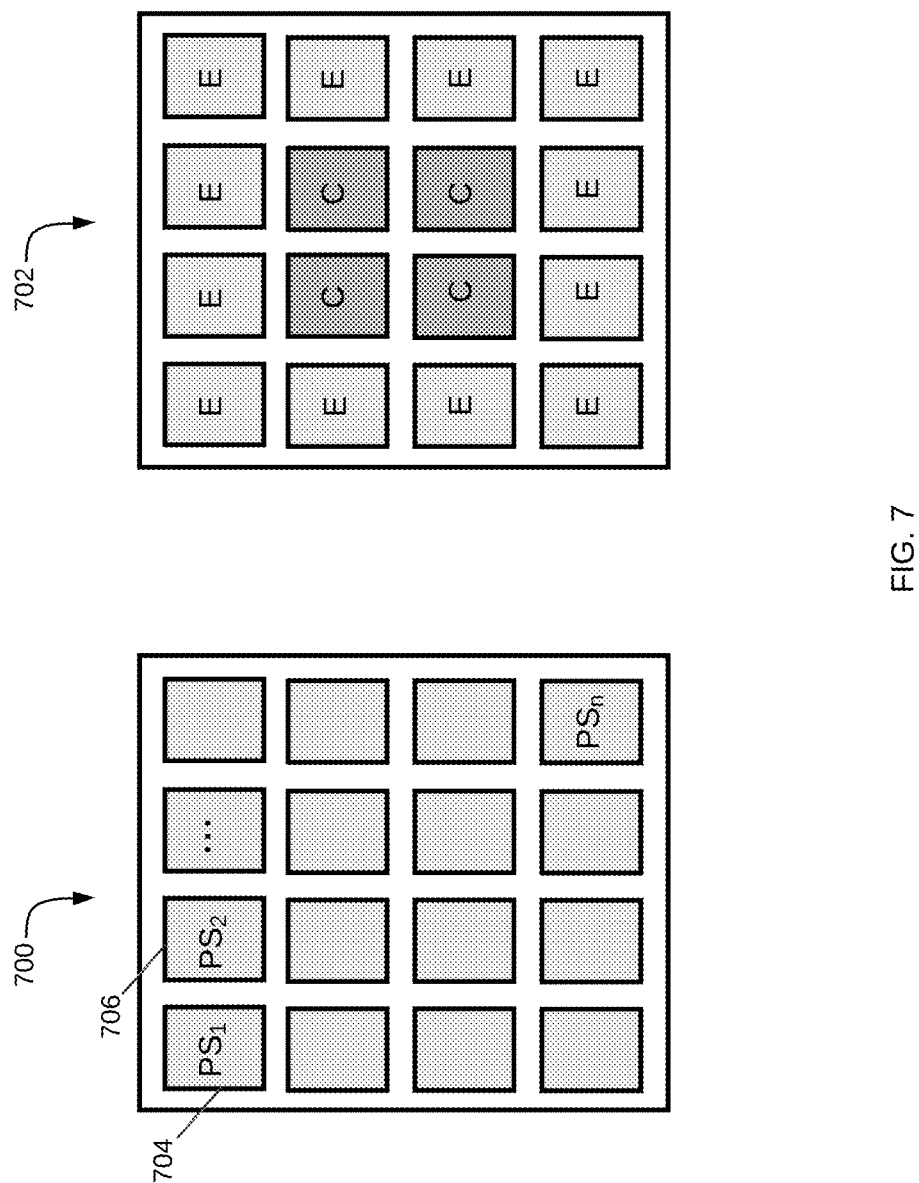
FIG. 7 illustrates two configurations of iMTM arrays in accordance with various examples.

Note that the flexibility in having reactance control in an iMTM cells enables multiple configurations of cells in an iMTM array. FIG. 7 illustrates two configurations of iMTM arrays in accordance with various examples. In the iMTM array 700, each iMTM cell may be controlled to generate beams with any desired phase. Cell 704 may generate beams with a phase of $PS_1$, cell 706 may generate beams with a phase of $PS_2$, and so on. The values of $PS_1$ and $PS_2$ change according to the voltage applied to the reactance control devices in their respective iMTM cells. In another configuration shown with iMTM array 702, a group of edge cells in the perimeter of the array (denoted by "E") may be controlled to generate beams with an output phase that is different than the output phase generated by a group of cells in the center of the array (cells denoted by "C"). Other configurations of cells within iMTM arrays may be implemented to achieve any desired phase profile for beams radiated off of iMTM cells.

It is appreciated that, as described above, reactance control is provided by each iMTM cell and also by a reactance control module in the impedance-matched feed network. In various examples, reactance control in an iMTM cell enables phase shifts along a given direction (e.g., azimuth), and the reactance control module in the impedance-matched feed network enables phase shifts along another direction (e.g., elevation), or vice-versa (e.g., elevation for the iMTM cell and azimuth for the feed network). In other examples, reactance control in an iMTM cell may enable phase shifts in both directions, while reactance control in the feed network may enable phase shifts in either direction depending on the orientation of the feed network and the waveguide signals propagating thereon. The DCiMTM antenna therefore provides full flexibility in achieving 360° beam steering for a true human-like 3D vision of its surrounding environment.

Figure 8:
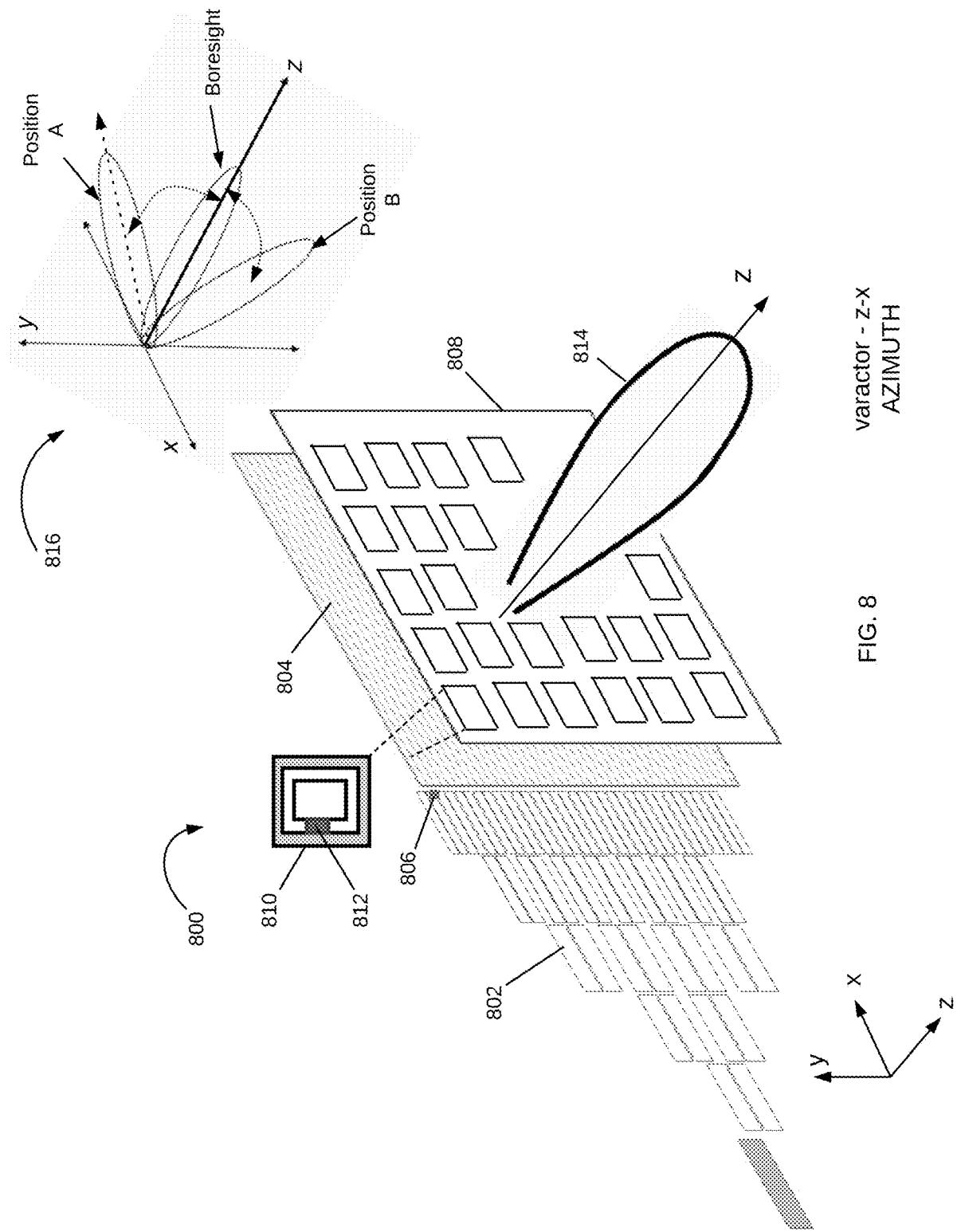
FIG. 8 is a schematic diagram of an impedance-matched feed network coupled to a transmission array and an iMTM array in accordance with various examples.

Attention is now directed to FIG. 8, which illustrates an impedance-matched feed network coupled to a transmission array and an iMTM array in accordance with various examples. DCiMTM antenna 800 has an impedance-matched feed network 802 that may be a power divider circuit such as described below with reference to FIG. 9. A transmission signal is provided at the input and fed to feed network 802 having multiple stages or levels. Note that the illustrated feed network configuration may incorporate a variety of other circuits, structures or components to enable smooth operation, such as to provide reactance matching of the various levels and distribution points, including coupling to the transmission array 804 and individual transmission lines formed therein. For example, a reactance control module 806 is included in the feed network 802 towards the end of a path or transmission line, and as described in more detail below with reference to FIG. 9.

The transmission array 804 is positioned proximate iMTM array 808 such that signals propagate through the transmission array 804 and are received at iMTM array 808 for radiation in the z-direction. The feed network 802 may take any of a variety of forms, and is illustrated here as a multi-layer, equally divided structure that feeds a plurality of super elements in the transmission array 804. Each super element has a plurality of slots or discontinuities positioned along its length that enable the propagating signal to travel through the slot forming electromagnetic radiation transmissions into the air or free space. The beam form and direction of the radiated signal is formed by iMTM array 808 of unit iMTM cells which are reactance controlled so as to change the resultant beamform. The iMTM array 808 may also output multiple beamforms by allocating subarrays or by controlling the parameters of the unit iMTM cells. An example iMTM cell 810 has a reactance control device 812 (e.g., a varactor) for producing a voltage controlled phase shift.

In the illustrated configuration, a radiation pattern 814 can be shifted in phase by the iMTM cells in the iMTM array 808 in the x-z plane or azimuth direction. The radiation pattern 814 can be shifted in phase by reactance control modules (e.g., module 806) in the impedance-matched feed network 802 in the y-z plane or elevation direction. Cutout 816 shows example positions for a shifted radiated beam. Position A represents a phase shift in the azimuth direction and position B represents a phase shift in the elevation direction. In this example, Position A is achieved by a phase shift introduced by an iMTM cell or cells, while Position B is achieved by a phase shift introduced by a reactance control module or modules in the impedance-matched feed network 802. This flexibility in steering radiation patterns in any direction of a 360° FoV enables true 3D vision with human-like capability.

Figure 9:
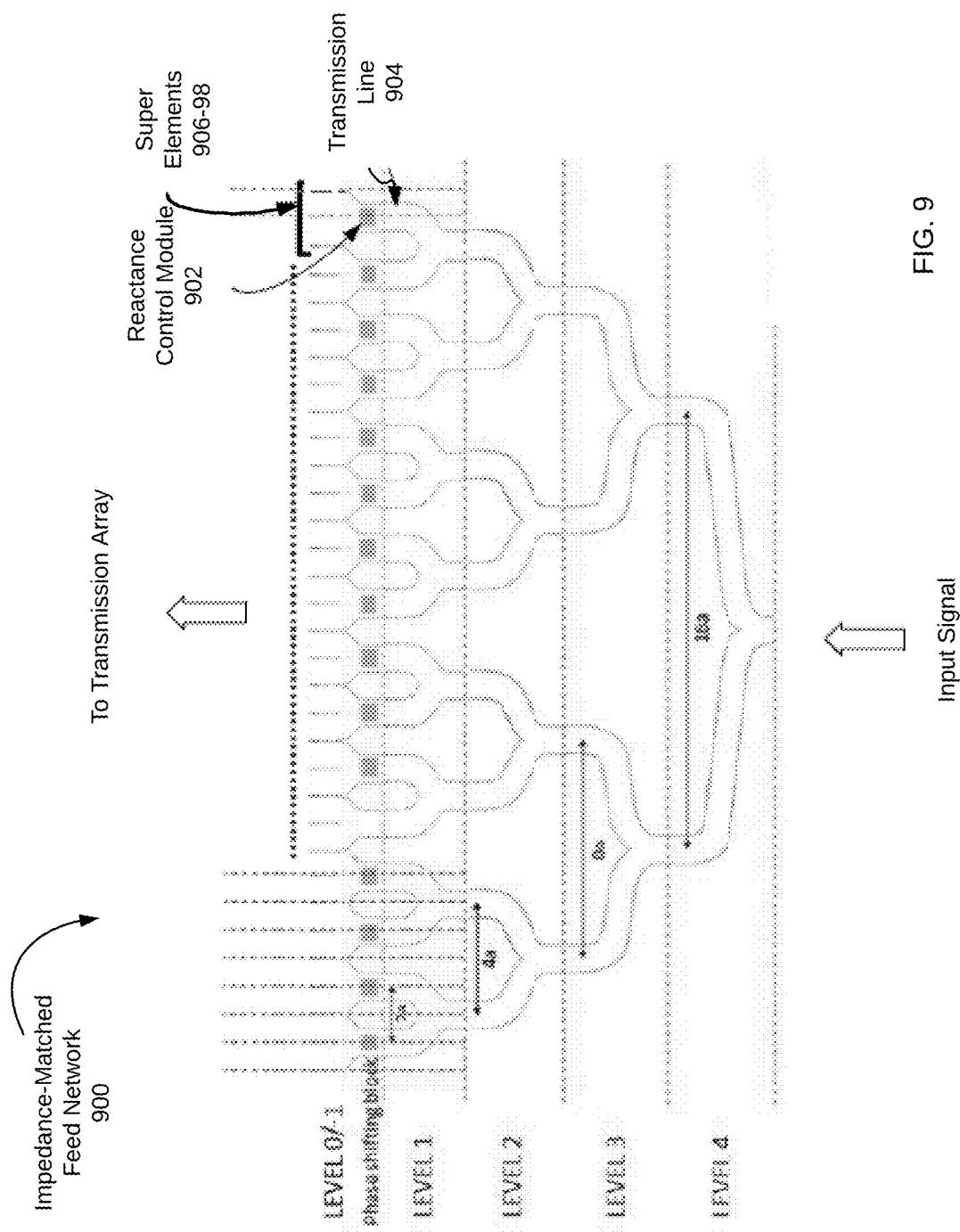
FIG. 9 is a schematic diagram of an impedance-matched feed network for use with the DCiMTM antenna of FIG. 2 in accordance with various examples.

Attention is now directed to FIG. 9, which shows a schematic diagram of an impedance-matched feed network for use with the DCiMTM antenna of FIG. 2 in accordance with various examples. Impedance-matched feed network 900 provides a corporate feed dividing the transmission signals received from a transmission signal controller (e.g., transmission signal controller 210 of FIG. 2) for propagation to a transmission array and an iMTM array (e.g., transmission array 220 and iMTM array 222 of FIG. 2). In the illustrated example, the feed network 900 is a type of a power divider circuit such that it takes an input signal and divides it through a network of paths or transmission lines. Each path may have similar dimensions; however, the size of the paths may be configured to achieve a desired transmission and/or radiation result. Each transmission line is a path in the feed network 900, which is shown to have 5 levels, wherein in each level the feed network 900 doubles its paths: level 4 has 2 paths, level 3 has 4 paths, level 2 has 8 paths, level 1 has 16 paths, and level 0 has 32 paths. The feed network 900 is designed to be impedance-matched, such that the impedances at each end of a transmission line matches the characteristic impedance of the line.

Each path may also include a reactance control module, e.g., reactance control module 902. The reactance control module 902 acts to change the reactance of a transmission line such as transmission line 904. There are a variety of ways to couple the reactance control modules to one or more transmission lines. The transmission lines of the feed network 900 reside in a substrate and are coupled to super elements 906-908 of a transmission array, such that the reactance control module 902 affects both super elements.

Figure 10:
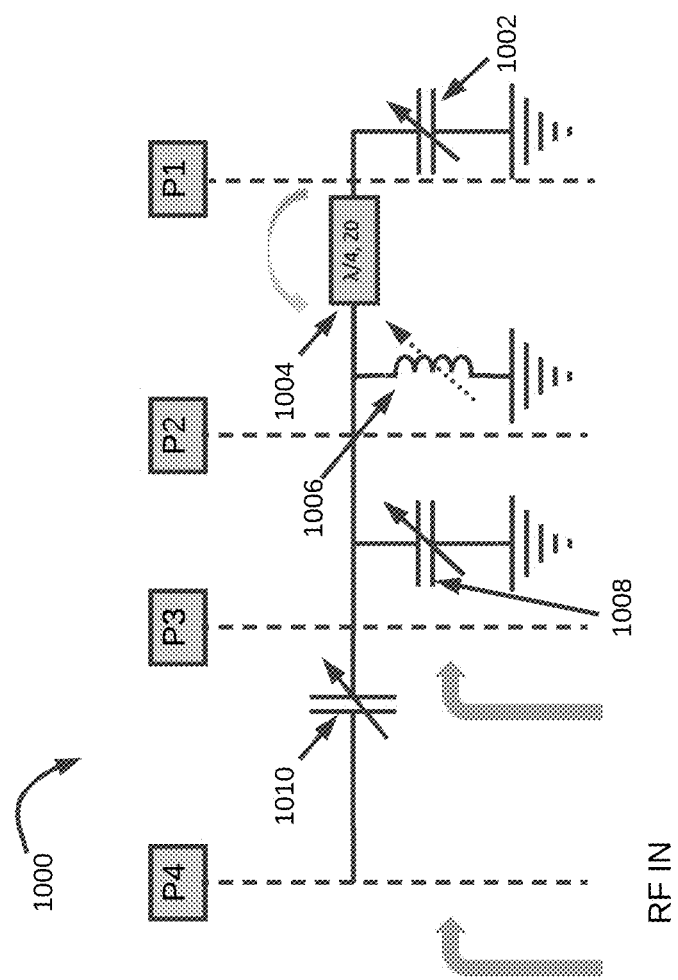
FIG. 10 is a schematic diagram of a circuit for increasing the tuning range and phase coverage of an ideal varactor in accordance with various examples.

The reactance control module 902 may include a varactor, a network of varactors, or a phase shift network. In the case of a single varactor, a full 360° phase shift may not be achievable due to physical design limitations. FIG. 10 shows a schematic diagram of a circuit for increasing the tuning range and phase coverage of an ideal varactor in accordance with various examples. Consider an ideal varactor 1002, i.e., a lossless non-linear reactance, with a given capacitance range (e.g., 20 to 80 fF) and no loss (Rs=0Ω). The ideal varactor 1002 can provide a phase shift in the range of about 52 to 126 degrees. Note that as an ideal varactor, this phase shift can occur in different spectrums, including a millimeter wave spectrum in the 30 to 300 GHz. In various applications where a full 360° phase shift is desired, this phase shift of the ideal case is not sufficient.

Circuit 1000 provides a solution to this problem by introducing a distributed varactor network. Distributed varactor network 1000 starts by adding a uniform (Z0) transmission line 1004 of a quarter of a wavelength, denoted by λ/4, connecting ideal varactor 1002 to inductor 1006 in parallel with varactor 1002. This creates a variable LC parallel circuit that can result in a purely inductive or purely capacitance reactance based on the value of varactor 1002. At reference plane P2, the variable capacitance of ideal varactor 1002 is transformed to a variable inductance with inductor 1006.

The distributed varactor network 1000 continues with the addition of another ideal varactor, varactor 1008, that is identical to ideal varactor 1002. This results in a parallel LC tank circuit, such that at reference plane P3, the tank circuit can behave either purely inductive, purely capacitive or have a resonance that depends on the value of the inductance L of inductor 106 and the capacitance C of varactors 1002 and 1008.

With the addition of another varactor to the distributed varactor network 1000, varactor 1010, in series with the parallel tank LC circuit formed by varactors 1002 and 1008 and inductor 1004, at reference plane P4, the distributed varactor network 1000 behaves as either purely inductive or purely capacitive. The resulting network 1000 forms a series LC or series CC circuit that results in a full 360° phase coverage in a Smith chart as well as a large variable reactance range.

FIG. 11 shows the Smith charts at each reference plane illustrated in the distributed varactor network of FIG. 10.

Smith charts 1100 include a Smith chart 1102 corresponding to reference plane P1 of FIG. 10, a Smith chart 1104 corresponding to reference plane P2 of FIG. 10, a Smith chart 1106 corresponding to reference plane P3 of FIG. 10, and a Smith chart 1108 corresponding to reference plane P4 of FIG. 10. Note that the phase coverage range shown in Smith chart 1102 corresponds to the phase coverage range of the varactor 1002, an ideal varactor with approximate phase coverage in the 52 to 126 degrees range. At P2, the inductor 1006 introduces a phase shift as shown in Smith chart 1104. The addition of the ideal varactor 1008 in parallel with LC circuit 1002-1006 results in an expanded phase coverage shown in Smith chart 1106. With the varactor 1010 placed in series with the LC tank circuit, the phase coverage of the distributed varactor network 1000 corresponds to a full 360° as shown in Smith chart 1108. As described above, this is highly desirable for many new millimeter wave applications, including autonomous driving applications where a full 360° phase shift enables object detection in a full FoV from the vehicle.

Note, however, that the distributed varactor network 1000 achieves the full 360° phase shift in the case of ideal varactors. Actual varactors designed for millimeter wave applications suffer from quality factor and tuning range limitations. The tuning range of a millimeter wave varactor is in reality much smaller than that of ideal varactors 1002, 1008 and 1010. In the case of millimeter wave varactors, a different design for a distributed varactor network is needed to achieve broader phase shifts.

Figure 12:
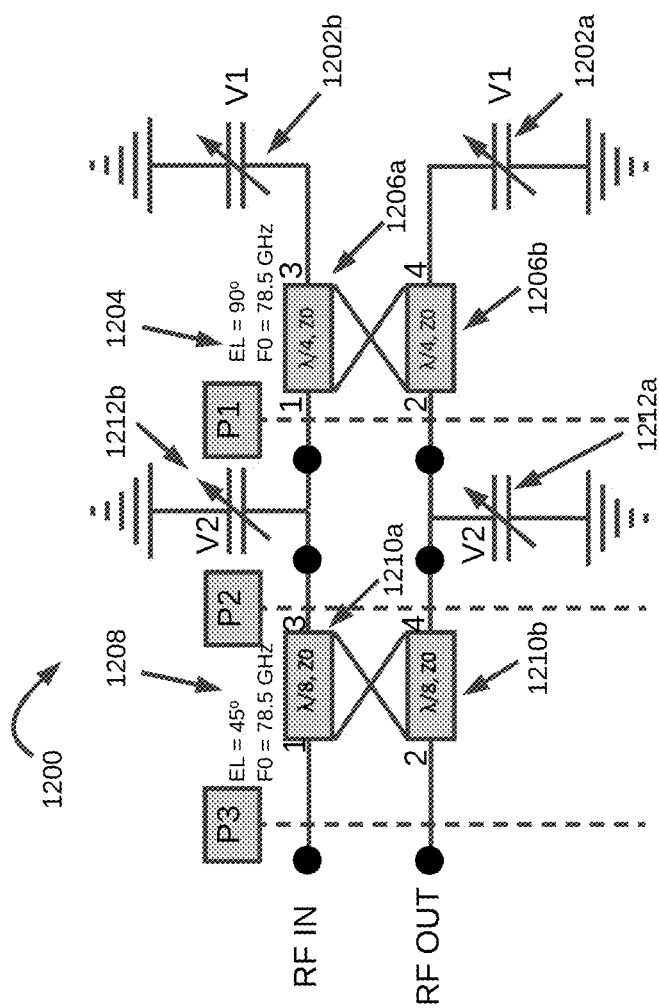
FIG. 12 is a schematic diagram of a distributed varactor network for millimeter wave applications in accordance with various examples.

Attention is now directed to FIG. 12, which shows a schematic diagram of a distributed varactor network for millimeter wave applications. Distributed varactor network 1200 is designed with varactors that have limited tuning range and quality factors at millimeter waves. In various examples, the varactors are GaAs varactors. In other examples, the varactors can be silicon varactors or other such material. The goal of the distributed varactor network 1200 is to expand the tuning range and phase coverage that can be achieved by varactors in millimeter wave applications.

Distributed varactor network 1200 achieves this by having distributed phase shifting elements interspersed with varactors and quarter wave transmission line sections. The network 1200 starts with varactors 1202a-b, which have, for example, low quality factors Q of around 5-6 and a capacitance range of around 37-72 fF in millimeter wave applications. This low Q is a limiting factor in achieving broader phase shifts in millimeter wave applications.

To address this challenge, a 3 dB, 90° hybrid line coupler 1204 having wave sections 1206a-b of λ/4 is coupled to varactors 1202a-b. The hybrid line coupler 1204 is a four-port device (labelled as ports 1-4 in FIG. 10) that can split a signal equally into two output ports having a 90° phase shift between them, or that can combine two signals while maintaining high isolation between the ports. The hybrid line coupler 1204 together with varactors 1202a-b results in a parallel LC circuit.

Adding another hybrid line coupler coupled to two more varactors, this time a 3 dB, 45° hybrid line coupler 1208 with wave sections 1210a-b of λ/8 coupled to varactors 1212a-b with a capacitance range of around 18-33 fF, results in a further increase of phase coverage as it provides another additional series LC-network with the parallel LC circuit formed by coupler 1204 and varactors 1202a-b.

Figure 13:
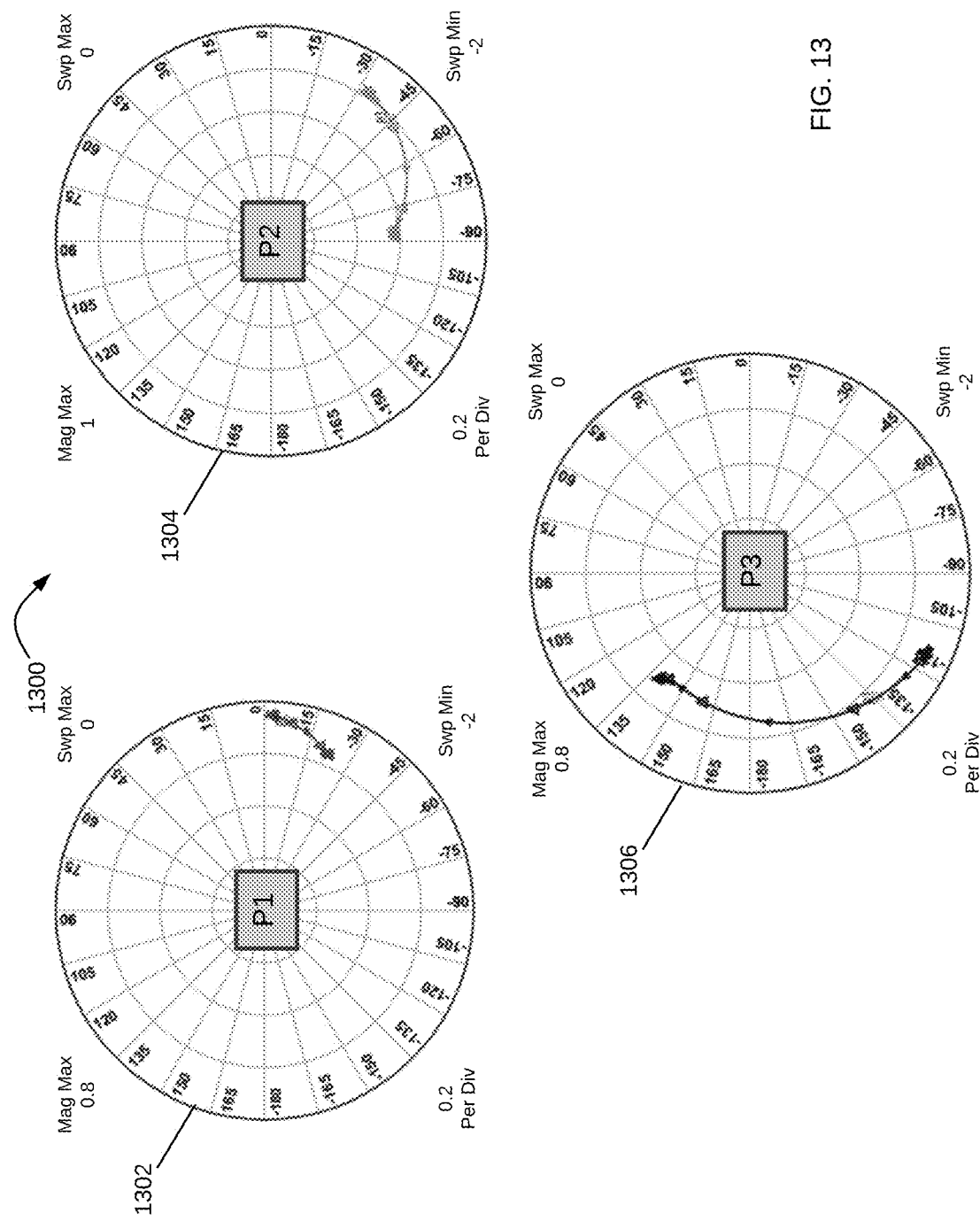
FIG. 13 shows the Smith charts at each reference plane illustrated in the distributed varactor network of FIG. 10.

The behavior of distributed varactor network 1200 can be further understood with reference to FIG. 13, which shows the Smith charts at each reference plane illustrated in FIG.

12. Smith charts 1300 include a Smith chart 1302 corresponding to reference plane P1 of FIG. 12, a Smith chart 1304 corresponding to reference plane P2 of FIG. 12, and a Smith chart 1306 corresponding to reference plane P3 of FIG. 12. Smith chart 1302 shows the limited phase range of varactors 1202a-b with hybrid coupler 1204. The phase range achieved from the hybrid coupler 1204 is only about 20°. Adding varactors 1212a-b increases the phase shift range to about 55° at reference plane P2, as shown in Smith chart 1304. With hybrid coupler 1208, the phase shift range increases at reference plane P3 by another 55°, thereby resulting in an overall phase shift range achieved by distributed varactor network of about 110°, as shown in Smith chart 1306.

It is appreciated that distributed varactor network 1200 can be cascaded with other distributed varactor networks 1200 to expand the phase shift range from about 120° to even higher values. However, doing so will result in further loss, which may not be desirable in millimeter wave applications. Distributed varactor network 1200 has a loss of up to 6 dB. Cascading another distributed varactor network to it will add another 6 dB.

It is also appreciated that differences in varactor and hybrid coupler implementations (e.g., use of ¼ wave section instead of the ⅛ wave section in coupler 1208), may result in variations in their specifications, which may result in variations in the phase shift range achievable by distributed varactor network 1200. For example, simulations have shown that phase shift ranges of 120° or more may be achievable with distributed varactor network 300.

Figure 14:
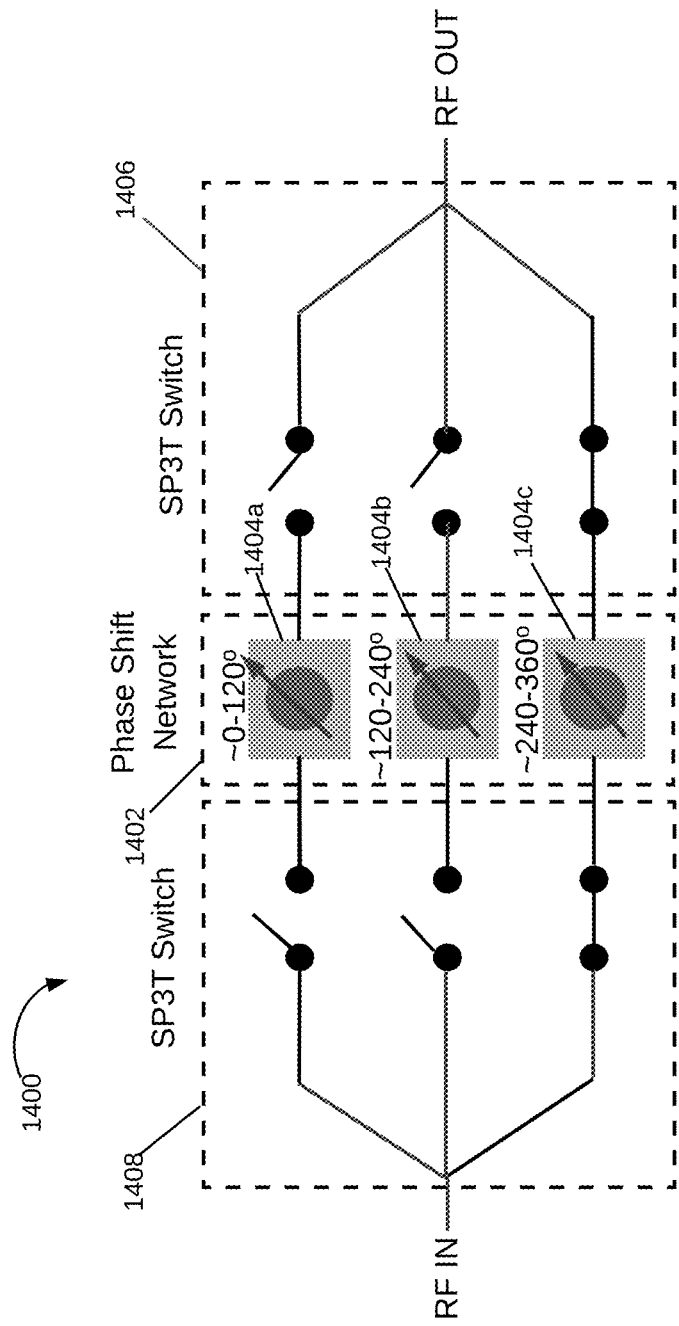
FIG. 14 shows a phase shift network incorporating the distributed varactor network of FIG. 3 to achieve up to a full 360° phase shift.

Attention is now directed at FIG. 14, which shows a phase shift network incorporating the distributed varactor network of FIG. 12 to achieve up to a full 360° phase shift. Phase shift network system 1400 has a phase shift network 1402 composed of three distributed varactor networks 1404a-c. Each one of the distributed varactor networks 1404a-c is capable of achieving phase shift ranges of up to 120° and may be implemented, for example, as the distributed varactor network 1200 of FIG. 12. In various examples, distributed varactor network 1404a is capable of achieving phase shifts from 0 to 120°, distributed varactor network 1404b is capable of achieving phase shifts from 120° to 240°, and distributed varactor network 1404c is capable of achieving phase shifts from 240° to 360°.

The phase shift network 1402 can be integrated with two 3-way RF switches, such as for example, SP3T switches 1406 and 1408. The switches 1406-1408 can be designed to have a loss of up to approximately 2.5 dB each. Since each distributed varactor network 1404a-c has a loss of up to 6 dB at a frequency of 77 GHz, the phase shift network circuit 1400 has a loss of up to 10-11 dB, which is significantly lower than the 18-20 dB loss typically experienced by conventional phase shift networks. The phase shift network circuit 1400 is therefore capable of providing a full 360° phase shift range at a low loss in the millimeter wave spectrum, which as described above, is required to realize the full potential of many millimeter wave applications, including in autonomous driving where accurate object detection and classification are imperative.

It is appreciated that phase shift network system 1400 can be incorporated into a reactance control module of an impedance-matched feed network, e.g., feed network 900 of FIG. 9, to achieve phase shifts in a given direction (e.g., azimuth or elevation). It is also appreciated that when combined with reactance control in iMTM cells, this results in 360° beam steering and a true 3D vision of the world by an iMTM radar system, e.g., iMTM radar system 100 of FIG. 1.

Figure 15:
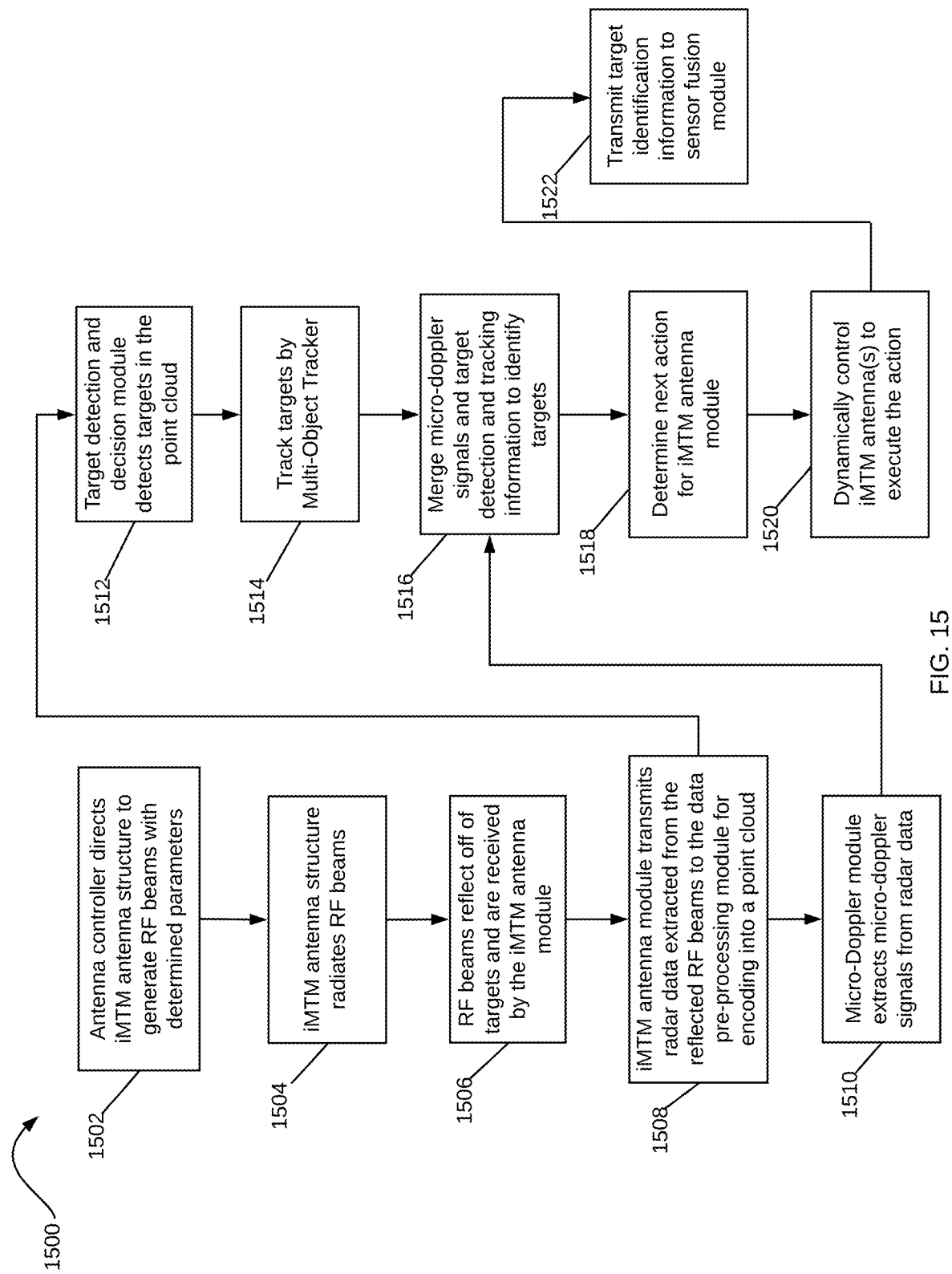
FIG. 15 is a flowchart illustrating the operation of an example iMTM radar system in more detail.

Attention is now directed to FIG. 15, which shows a flowchart illustrating the operation of an example iMTM radar system in more detail. In one example, the iMTM radar system may be implemented as the iMTM radar system 100 of FIG. 1. In operation, the antenna controller 110 is responsible for directing the DCiMTM antenna 106 to generate RF beams with determined parameters such as beam width, transmit angle, etc. (1502). The antenna controller 110 may, for example, determine the parameters at the direction of iMTM interface module 104, which may at any given time want to focus on a specific area of a FoV upon identifying targets of interest in the vehicle's path. The antenna controller 110 determines the direction, power, and other parameters of the beams and controls the DCiMTM antenna 106 to achieve beam steering in various directions. The antenna controller 110 also determines a voltage matrix to apply to capacitance control mechanisms in the DCiMTM antenna 106 (or coupled to the DCiMTM antenna 106) to achieve a given phase shift. In some examples, the DCiMTM antenna 106 is adapted to transmit a directional beam through active control of the reactance parameters of the individual iMTM cells in iMTM antenna arrays (e.g., iMTM array 222 of FIG. 2) of the DCiMTM antenna 106. The iMTM interface module 104 provides control actions to the antenna controller 110 at the direction of the target identification and decision module 114.

Next, the DCiMTM antenna 106 radiates RF beams having the determined parameters (1504). The RF beams are reflected off of targets in and around the vehicle's path (e.g., in a 360° field of view) and are received by the transceiver module 108 in the iMTM antenna module 102 (1506). The iMTM antenna module 102 then transmits 4D radar data to the data pre-processing module 112 for encoding into a point cloud (1508). The micro-doppler module 116 coupled to the iMTM antenna module 102 and the iMTM interface module 104 extracts micro-doppler signals from the 4D radar data to aid in the identification of targets by the target identification and decision module 114 (1510). The micro-doppler module 116 takes a series of RD maps from the iMTM antenna module 102 and extracts a micro-doppler signal from them. The micro-doppler signal enables a more accurate identification of targets as it provides information on the occupancy of a target in various directions.

The target identification and decision module 114 receives the 4D radar data from the iMTM antenna module 102, processes the radar data to detect and identify targets, and determines the control actions to be performed by the iMTM antenna module 102 based on the detection and identification of such targets (1512). For example, the target identification and decision module 114 may detect a cyclist on the path of the vehicle and direct the iMTM antenna module 102, at the instruction of its antenna controller 110, to focus additional RF beams at given phase shift and direction within the portion of the field of view corresponding to the cyclist's location.

The iMTM interface module 104 also includes a multi-object tracker 118 to track the identified targets over time, such as, for example, with the use of a Kalman filter (1514). Information on identified targets over time are stored at a target list and occupancy map 120, which keeps tracks of targets' locations and their movement over time as determined by the multi-object tracker 118. The tracking information provided by the multi-object tracker 118 and the micro-doppler signal provided by the micro-doppler module 116 are combined to produce an output containing the type of target identified, their location, their velocity, and so on (1516). This information from iMTM interface module 104 is then used to determine next actions to be performed by the iMTM antenna module 102 such as what beams to send next and with which parameters (e.g., beam width, azimuth and elevation angles, etc.) (1518). The determination may also include a selection of subarrays in the iMTM antenna arrays in the iMTM antenna module 102 from which to send the next beams. The DCiMTM antenna controls its reactance parameters to generate the beams at the desired directions (1520). The output from the iMTM interface module 104 is also sent to a sensor fusion module (described in more detail below with reference to FIG. 16) where it is processed together with information from other sensors in the vehicle (1522).

Figure 16:
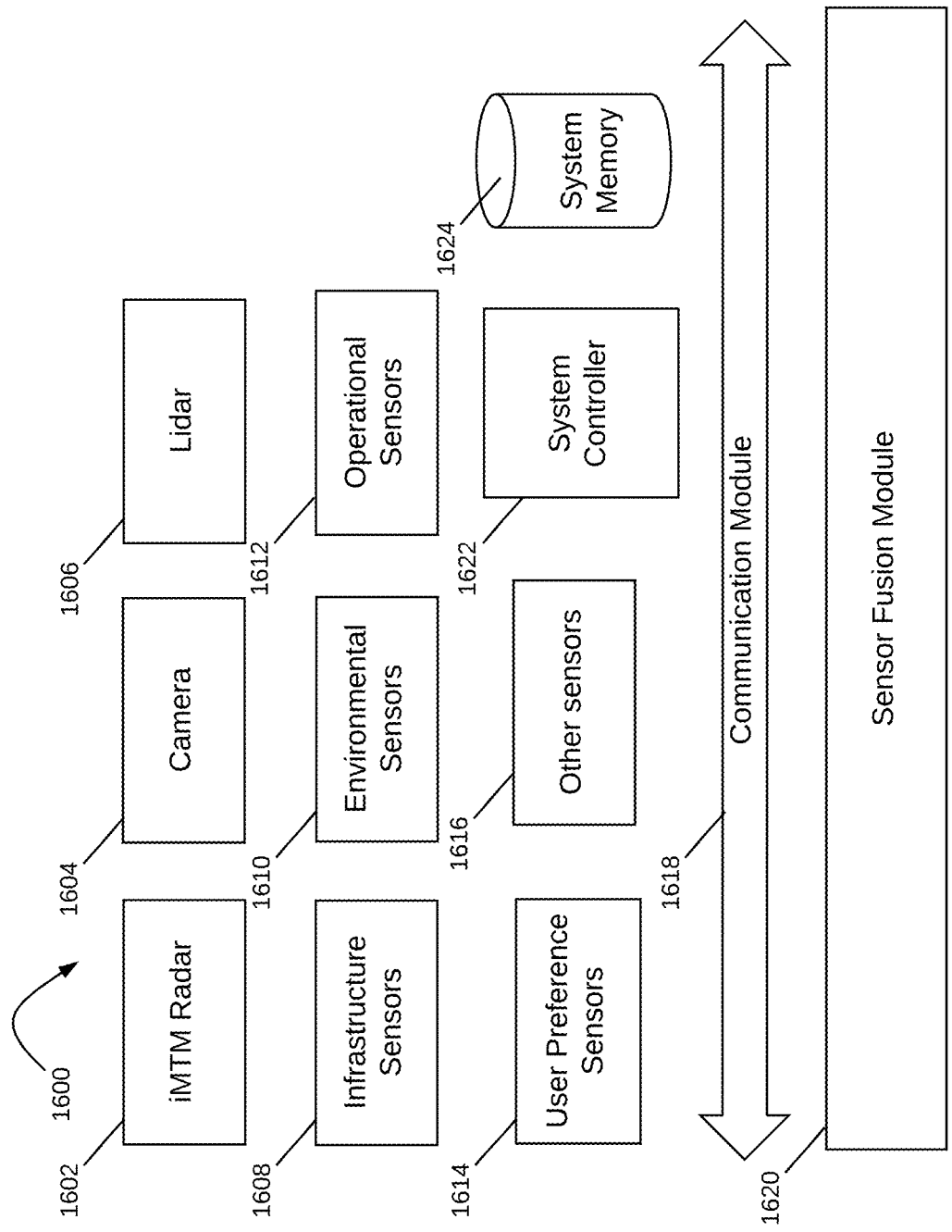
FIG. 16 is a schematic diagram of an autonomous driving system having an iMTM radar in accordance with various examples.

FIG. 16 illustrates a schematic diagram of an autonomous driving system having an iMTM radar in accordance with various examples. Autonomous driving system 1600 is a system for use in a vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 1600 includes an iMTM radar 1602 and other sensor systems such as camera 1604, lidar 1606, infrastructure sensors 1608, environmental sensors 1610, operational sensors 1612, user preference sensors 1614, and other sensors 1616. Autonomous driving system 1600 also includes a communications module 1618, a sensor fusion module 1620, a system controller 1622 and a system memory 1624. It is appreciated that this configuration of autonomous driving system 1600 is an example configuration and not meant to be limiting to the specific structure illustrated in FIG. 16. Additional systems and modules not shown in FIG. 16 may be included in autonomous driving system 1200.

iMTM radar 1206 includes an iMTM antenna module (e.g., iMTM antenna module 102) for providing dynamically controllable and steerable beams that can focus on one or multiple portions of a 360° FoV of the vehicle. The beams radiated from the iMTM antenna module are reflected back from targets in the vehicle's path and surrounding environment and received and processed by the iMTM radar 1602 to detect and identify the targets. The iMTM radar 1602 also has an iMTM interface module (e.g., iMTM interface module 104 of FIG. 1) that is trained to detect and identify targets and control the iMTM antenna module as desired.

Camera sensor 1604 may be used to detect visible targets and conditions and to assist in the performance of various functions. The lidar sensor 1606 can also be used to detect targets outside the vehicle and provide this information to adjust control of the vehicle. This information may include information such as congestion on a highway, road conditions, and other conditions that would impact the sensors, actions or operations of the vehicle. Camera sensors are currently used in ADAS systems to assist drivers in driving functions such as parking (e.g., in rear view cameras). Cameras are able to capture texture, color and contrast information at a high level of detail, but similar to the human eye, they are susceptible to adverse weather conditions and variations in lighting. Lidar sensors measure the distance to an object by calculating the time taken by a pulse of light to travel to an object and back to the sensor. When positioned on top of a vehicle, lidars are able to provide a 360° 3D view of the surrounding environment. However, lidar sensors are still prohibitively expensive, bulky in size, sensitive to weather conditions and are limited to short ranges (typically <200 m), with resolution decreasing with range. Radars, on the other hand, have been used in vehicles for many years and operate in all-weather conditions. Radars also use far less processing than the other types of sensors and have the advantage of detecting targets behind obstacles and determining the speed of moving targets.

Infrastructure sensors 1608 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 1610 detect various conditions outside, such as temperature, humidity, fog, visibility, precipitation, and so forth. Operational sensors 1612 provide information about the functional operation of the vehicle. This may be tire pressure, fuel levels, brake wear, and so forth. The user preference sensors 1614 may be configured to detect conditions that are part of a user preference. This may be temperature adjustments, smart window shading, and so forth. Other sensors 1616 may include additional sensors for monitoring conditions in and around the vehicle.

In various examples, the sensor fusion module 1620 optimizes these various functions to provide an approximately comprehensive view of the vehicle and environments. Many types of sensors may be controlled by the sensor fusion module 1620. These sensors may coordinate with each other to share information and consider the impact of one control action on another system. In one example, in a congested driving condition, a noise detection module (not shown) may identify that there are multiple radar signals that may interfere with the vehicle. This information may be used by the iMTM interface module in system 1600 to adjust the beam size of the iMTM antenna module so as to avoid these other signals and minimize interference.

In another example, environmental sensor 1610 may detect that the weather is changing, and visibility is decreasing. In this situation, the sensor fusion module 1620 may determine to configure the other sensors to improve the ability of the vehicle to navigate in these new conditions. The configuration may include turning off camera or laser sensors 1604-1606 or reducing the sampling rate of these visibility-based sensors. This effectively places reliance on the sensor(s) adapted for the current situation. In response, the iMTM interface module (e.g., iMTM interface module 104 of FIG. 1) configures the iMTM radar 1602 for these conditions as well. For example, the iMTM radar 1602 may reduce the beam width to provide a more focused beam, and thus a finer sensing capability.

In various examples, the sensor fusion module 1620 may send a direct control to the iMTM antenna module (e.g., iMTM antenna module 102) based on historical conditions and controls. The sensor fusion module 1620 may also use some of the sensors within system 1600 to act as feedback or calibration for the other sensors. In this way, an operational sensor 1612 may provide feedback to the iMTM interface module and/or the sensor fusion module 1620 to create templates, patterns and control scenarios. These are based on successful actions or may be based on poor results, where the sensor fusion module 1620 learns from past actions.

Data from sensors 1602-1616 may be combined in sensor fusion module 1620 to improve the target detection and identification performance of autonomous driving system 1600. Sensor fusion module 1620 may itself be controlled by system controller 1622, which may also interact with and control other modules and systems in the vehicle. For example, system controller 1622 may turn the different sensors 1602-1616 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 1600 communicate with each other through communication module 1618. Autonomous driving system 1600 also includes system memory 1624, which may store information and data (e.g., static and dynamic data) used for operation of system 1600 and the vehicle using system 1600. Communication module 1618 may also be used for communication with other vehicles, referred to as V2V communication. V2V communications may include information from other vehicles that is invisible to the user, driver, or rider of the vehicle, and may help vehicles coordinate to avoid an accident.

Figure 17:
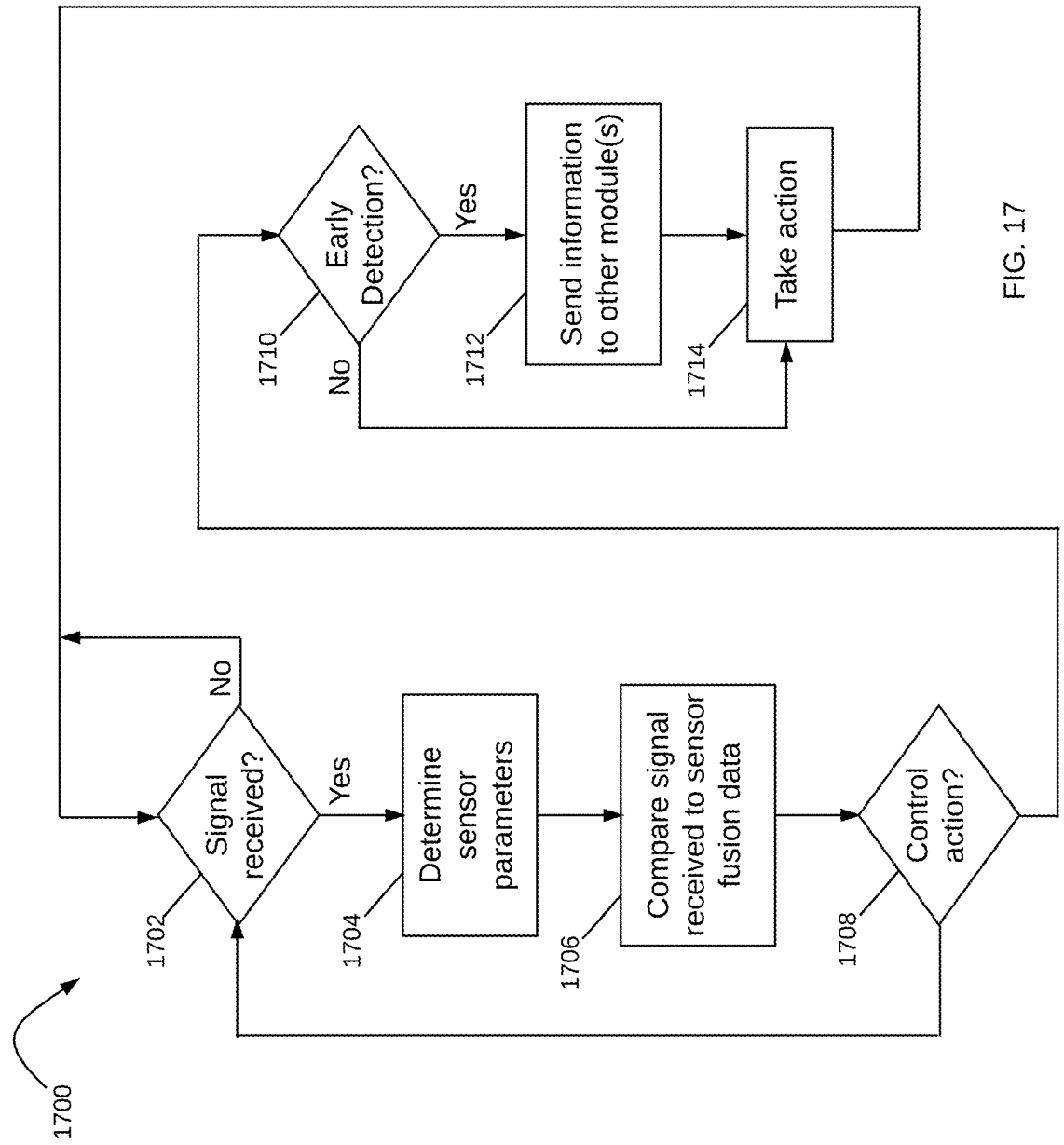
FIGS. 17-18 illustrate processes implemented in the sensor fusion module of FIG. 12.
Figure 18:
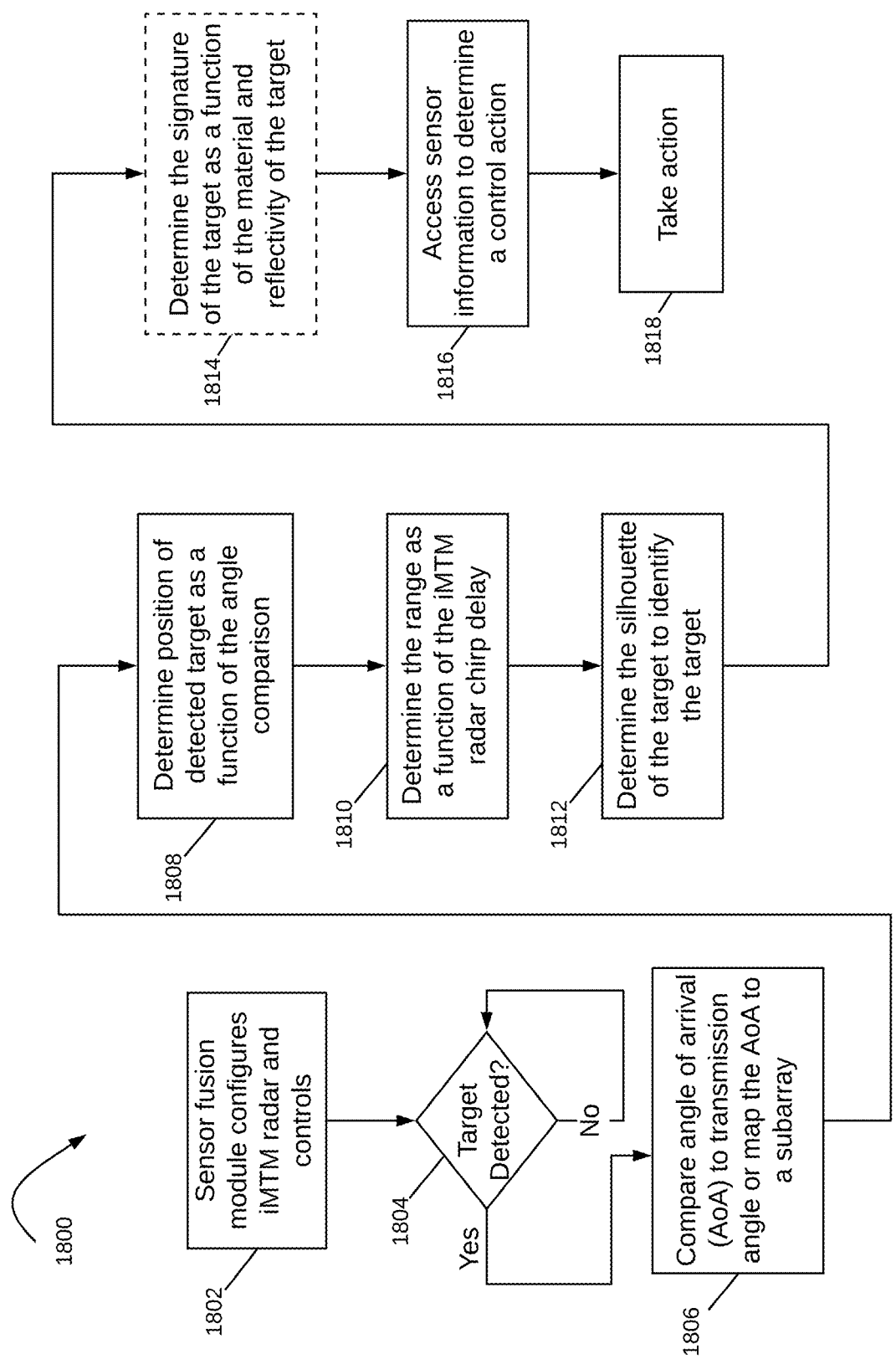

Attention is now directed to FIGS. 17-18, which illustrate processes implemented in the sensor fusion module 1620 of FIG. 16, and actions based on sensor readings. In FIG. 17, a process 1700 looks to see if a signal is received from any of the sensors within a system (1702), such as in sensor fusion module 1620 of FIG. 16. If no signal is received, processing continues to listen for sensor signals. When a signal is received (1702), the sensor fusion module 1620 determines the sensor parameters (1704), which include the information type received from the sensor. This information may be stored for analysis as to actions taken by the vehicle to enable intelligent, flexible, and dynamic control. The process 1700 then continues to compare the signal received to data stored by the sensor fusion module 1620 (1706) wherein such data may be stored in memory (not shown) or stored in a networked repository, such as a cloud database and system (not shown). At this point, if a control action is indicated at 1708, processing continues to determine if this control action and/or the information received from the sensor will provide early detection for this or another action. This early detection check (1710) allows the entire sensor ecosystem to take advantage of information from any of the sensors in the autonomous driving system 1600. If the sensor information may be used for early detection (1710) then the information is sent to one or more modules (1712), or is stored in memory as a data point in the current scenario. The autonomous driving system 1600 then takes the indicated action (1714) and returns to listen for signals at 1702. If the information is not used for early detection at 1710, then processing continues to take the indicated action at 1714. If no control action is indicated at 1708, processing returns to listen for sensor signals.

FIG. 18 illustrates another process 1800 according to some examples, wherein the sensor fusion module 1620 configures sensors and controls for operation at 1802. This may be a dynamic step or may be a persistent configuration. When a target is detected by the iMTM radar 1602 (1804), the process 1800 uses that information to calculate or determine specifics relating to the target with respect to the antenna position. The angle of arrival ("AoA") is compared to the transmission angle or is mapped to a subarray in the DCiMTM antenna in iMTM radar 1602 (1806). This information is used to determine the position of the detected target in 2D or 3D space (1808). The range, or distance from the antenna to the target, is a function of the radar chip delay (1810). The information from the iMTM radar 1602 and other sensors is used to determine a silhouette and/or footprint of the target (1812). Optionally, information from the sensor(s) may provide a target signature of the target (1814), depending on the target's composition (e.g., metal, human, animal) and so forth. This may be an indication of the reflectivity of the target. The target signature is a more detailed understanding of the target, which may give dimensions, weight, and so forth. Alternatively, the target may be identified as described above with the target identification and decision module 114 of FIG. 1. The sensor fusion module 1620 then accesses sensor information to determine a control action (1816) and instructs the vehicle to take action (1818).

A variety of information is determined from the iMTM radar 1602; such information may be a function of the modulation waveform and technique, the frequency, the chirp delay, the frequency change of the received signal and so forth. The specific radiation pattern used may be crafted to accomplish specific goals according to the application. The sensor fusion module 1620 enables such control to optimize the system and reduce the processing required. For example, the iMTM radar 1602 may be used to reduce the number of sensors and/or the active time of each sensor. In this way, some sensors may be disabled during certain conditions, and activated on a change in that condition.

The various examples described herein support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

Figure 19:
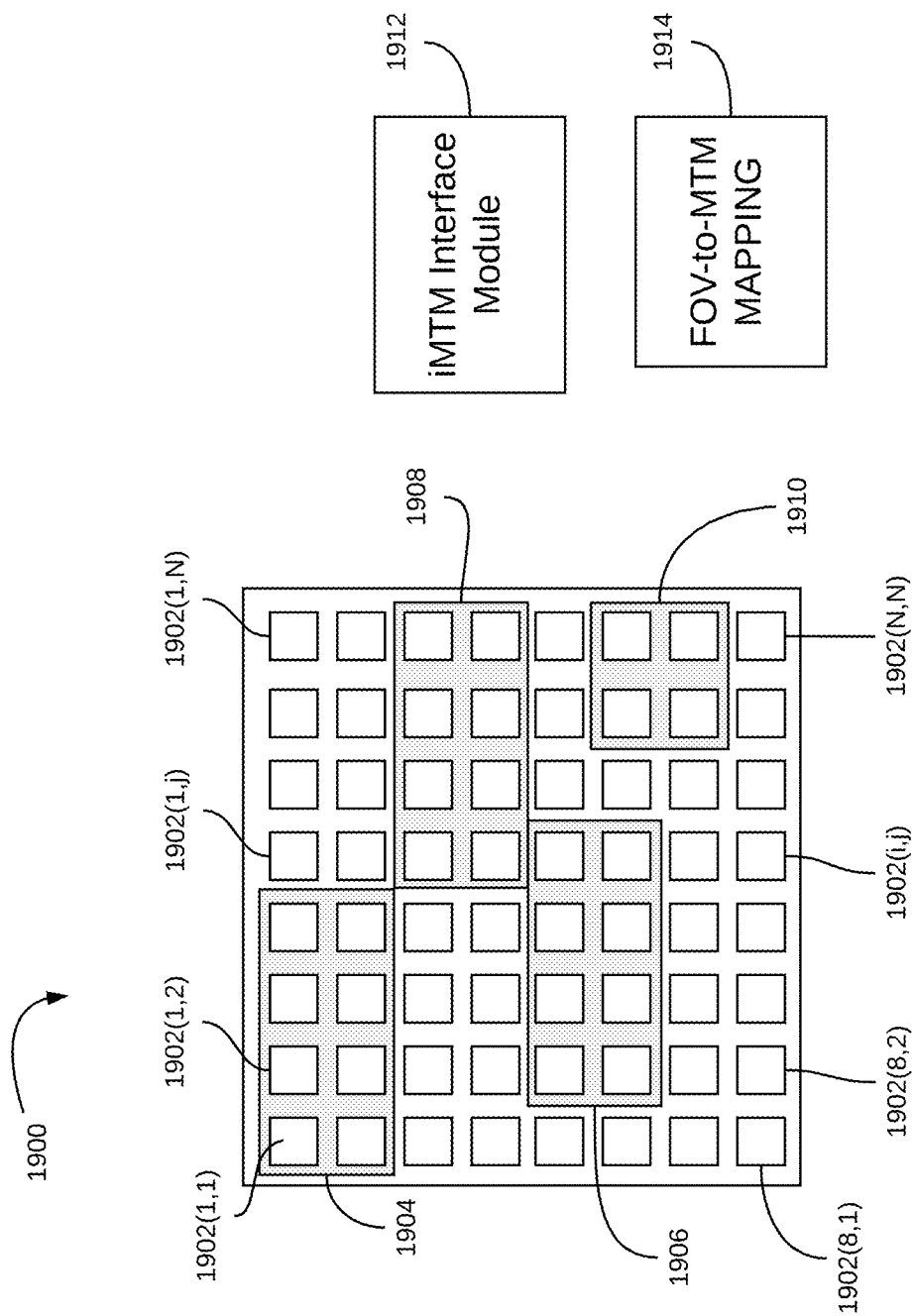
FIG. 19 is a schematic diagram of an example DCiMTM antenna in accordance with various examples.

These capabilities in a radar as iMTM radar 100 of FIG. 1 are enabled with the use of an iMTM antenna structure such as DCiMTM antenna 106 in iMTM antenna module 102. FIG. 19 illustrates a DCiMTM antenna 1900 (or a portion of a structure) having a plurality of iMTM cells arranged in an array of N×N unit cells, wherein for clarity and discussion herein each unit cell is identified by a row, column index (i,j). The array can be an asymmetric N×M array as well. For simplicity, a symmetric N×N case is described. For example, from the viewer's perspective, the unit cell in the upper corner is identified as 1902 (1,1); and the unit cell in the bottom right is identified as 1902 (N,N). Other configurations are possible based on the application, structure, physics and goals of the DCiMTM antenna 1900. DCiMTM antenna 1900 is part of an antenna system or module, e.g., iMTM antenna module 102 of FIG. 1, that includes other modules, some of which are not shown in this drawing. Similarly, the specific shape of the unit cells may take on any of a variety of shapes that result in the characteristics and behavior of metamaterials and are not restricted to square or rectangular or any other regular shape.

Each of the unit cells 1902 (i,j) in the DCiMTM antenna 1900 may operate individually or as part of a subarray. As illustrated, the iMTM interface module 1912 (e.g., implemented like the iMTM interface module 104 of FIG. 1) has associated or grouped specific unit cells into sub-arrays 1904-1910. The iMTM interface module 1912 determines where the radiated beam is to be directed, the shape of the beam and the dimensions of the beam. The beam may be a coarse or large bandwidth beam, a midsized beam or a small, narrow bandwidth beam depending on the situation, the target detected and the timing of the detection, as well as other considerations. The iMTM interface module 1912 may preconfigure one or more of the subarrays to anticipate a next action, or may use a default configuration, such as to start with a broad bandwidth which enables a faster scan capability or sweep time. For each sweep, the FoV is divided into portions, which may have consistent dimensions, different dimensions or may be dynamically adjusted. In some examples, the iMTM interface module 1912 selects specific directions to have a narrow beam, such as directly in front of the vehicle; other directions, such as on the edges of the FoV may be scanned with a wide beam. These and other design considerations are made by the designer in setting up the iMTM interface module 1912, wherein some are flexible and configurable. In the illustrated example, the DCiMTM antenna 1900 has several subarrays that are intended to direct the beam and form the desired radiation pattern.

Once a target is detected and identified, the FoV-to-MTM mapping 1914 identifies the portion of the FoV for the iMTM interface module 1912 and maps that location to a specific iMTM unit cell or subarray that will focus on and capture more information about the target. In some examples, the iMTM interface module 1912 has access to various scenarios and may use detected information to predict future conditions on the road. For example, if the DCiMTM antenna 1900 detects a deer running across the road in an area having a known deer path, the iMTM interface module 1912 may predict the direction of the deer, as well as anticipate other deer that may follow. The radiation beams from DCiMTM antenna 1900 may sweep across the FoV, wherein the visual field of view and the antenna field of view are not necessarily the same. In this case, the antenna FoV may be a 2D view, whereas targets are typically 3D. Various systems and configurations enable 3D target detection and classification through placement of transmit and receive antenna arrays and or combinations of multiple transmit to multiple receive structures.

Figure 20:
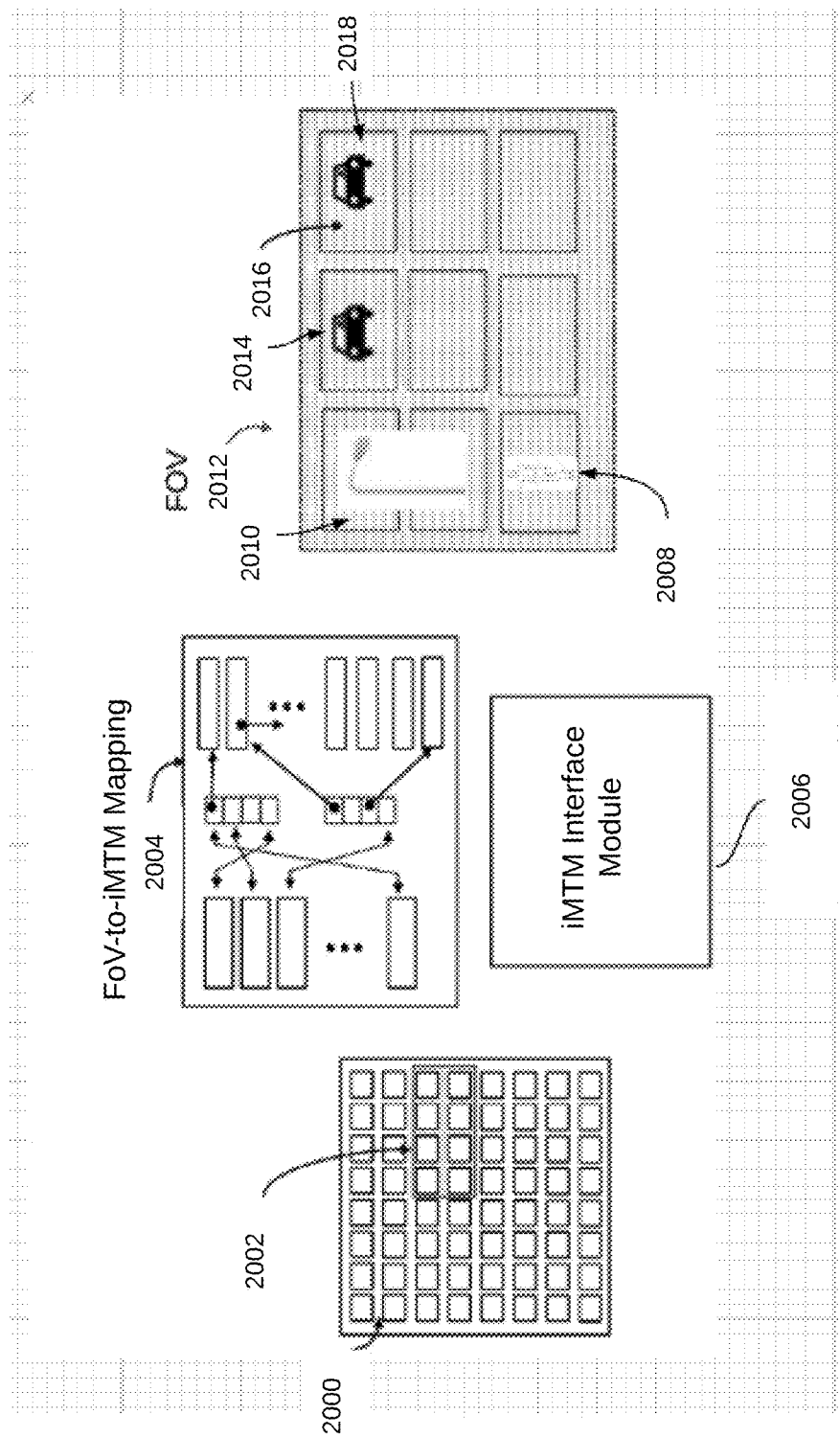
FIG. 20 illustrates an example iMTM antenna array for use in an DCiMTM antenna.

FIG. 20 illustrates an iMTM antenna array 2000 having at least one sub-array 2002 activated to generate beams to capture a specific area or FoV 2012, corresponding to the iMTM radar system 100 of FIG. 1. When the car 2018 is detected within an area 2016, the iMTM interface module 2006 identifies the associated portion 2016 of the FoV 2012. This is mapped to the portion of the iMTM antenna array 2000 that will generate a focused beam in that area; and that portion is sub-array 2002. Similarly, car 2014 is also identified within FoV 2012 in another area; street lamp 2010 and person 2008 are also located within FoV 2012. The radar system has a mapping from the FoV to the iMTM array 2004, which may be configured as a Look Up Table ("LUT"), as a formula, or as another mapping format that configures subarrays of the iMTM array 2000 to generate a beam toward individual portions of the FoV 2012. In this way, there is low latency dynamic adjustment of the radiation beam for beam forming and beam steering. The ability to capture multiple targets with a single subarray acts to further reduce the delay in detection and communication, reducing the time from detection to action.

As illustrated in FIG. 20, the mapping between the iMTM antenna array 2000 and the FoV 2012 is provided by FoV-to-MTM mapping unit 2004, which includes various entries for such correlation. This type of mapping format may be dynamically adjusted to keep pace with the movement of vehicles; in addition, this information may be stored in a relational database or other device to assist the iMTM interface module 2006 in learning and improving over time. In this way and as described above, the iMTM interface module 2006 may use AI, machine learning, deep learning, an expert system, and/or other technology to improve performance of the iMTM radar system for target detection and identification.

As a vehicle travels, there are different FoV snapshots or slices, such as from a near-field to a far-field slice. From the perspective of a vehicle, there is a near-field FoV, a far-field FoV, and several mid-field FoVs, which may each be considered as a slice of information. The information may be stored according to angle of arrival, range to the target, velocity of the target, Doppler information from the received signal and so forth. In various examples, these are referred to as Range-Doppler maps. Each slice corresponds to an instant in time as the car travels. The iMTM interface module 2006 determines which type of beam is broadcast for each FoV as a function of many parameters, including, for example, the speed of the car and the speed of a detected object in relation to the car. The iMTM interface module 2006 may also determine that for specific conditions, the beams are meant to reach a specific FoV, such as where the car is moving slowly, a given FoV may be sufficient, but if the car is moving rapidly, then there is a desire to reach a full FoV. Weather conditions will have an impact as well, such that if the car will take longer to react, stop or otherwise change the current driving conditions, then the iMTM interface module 2006 may desire to reach the longest FoV to allow the car time to react. This may be utilized for snow or icy conditions, which dramatically impact how quickly a car may decelerate and/or halt.

Some other considerations for antenna applications, such as for radar antennas used in vehicles, include the antenna design, capabilities, and receiver and transmitter configurations. A typical electronic system with an antenna array consists of two or more antenna elements, a beam forming network, and a receiver and/or transmitter. The beamforming network may consist of a Butler matrix or other antenna arrays combined with phase shifting elements. Many different antenna configurations can be utilized as an antenna element in the antenna array: simple dipole, monopole, printed patch design, Yagi antenna, and so forth. One of the primary goals for antennas mounted on/in the car is to achieve a compact and aesthetic design. Other goals relate to the type of communication signal used for the radar beam. One type of modulation is the FMCW modulation, which is effective in radar applications, as radar does not need to pulse, but rather transmits continuously. FMCW is a continuous carrier modulated waveform that is transmitted as a continuous periodic function, such as sinusoid, sawtooth, triangular and so forth. The sweep time, or sweep period, $T_s$, is the time for transmission of one period of the waveform. The signal transmitted during one sweep period is referred to as a chirp. There is a difference in the frequency of the transmit and receive signals that is referred to as the beat frequency, $b_f$. The range of the antenna, r, is the distance from the antenna to a detected target, and is a function of the sweep period, beat frequency, the speed of light, c, and the sweep bandwidth, $B_s$. A moving target induces a Doppler frequency shift that enables radar to detect the relative velocity of the target with respect to the antenna. The phase difference between the transmit and receive signals provides location information, while the frequency shift identifies a speed. In the case of moving targets, the signal phase distortions may impact the performance of the antenna array. One way to offset such distortion is to use multiple subarrays at the transmit and receive sides to filter out these impurities. Another way is to adjust the antenna calibration on-the-fly to reduce the phase distortion of moving targets.

Traditional phase shifting may be used to control the beam of an antenna. Phased array antennas have multiple elements that are fed so as to have a variable phase or time-delay at each element and so that the beam scans from different angles. The multiple elements provide radiation patterns with lower sidelobes and enables careful beam shaping. The beam can be repositioned for more directed and efficient operation.

The various examples described herein provide a DCiMTM antenna that provides phase shifting without the active elements required to change the phase, or in the traditional ways. The DCiMTM antenna structures of various examples use the characteristics of the metamaterial shape and configuration to provide phase shifts without the use of mechanical or electrical phase shifters.

Figure 21:
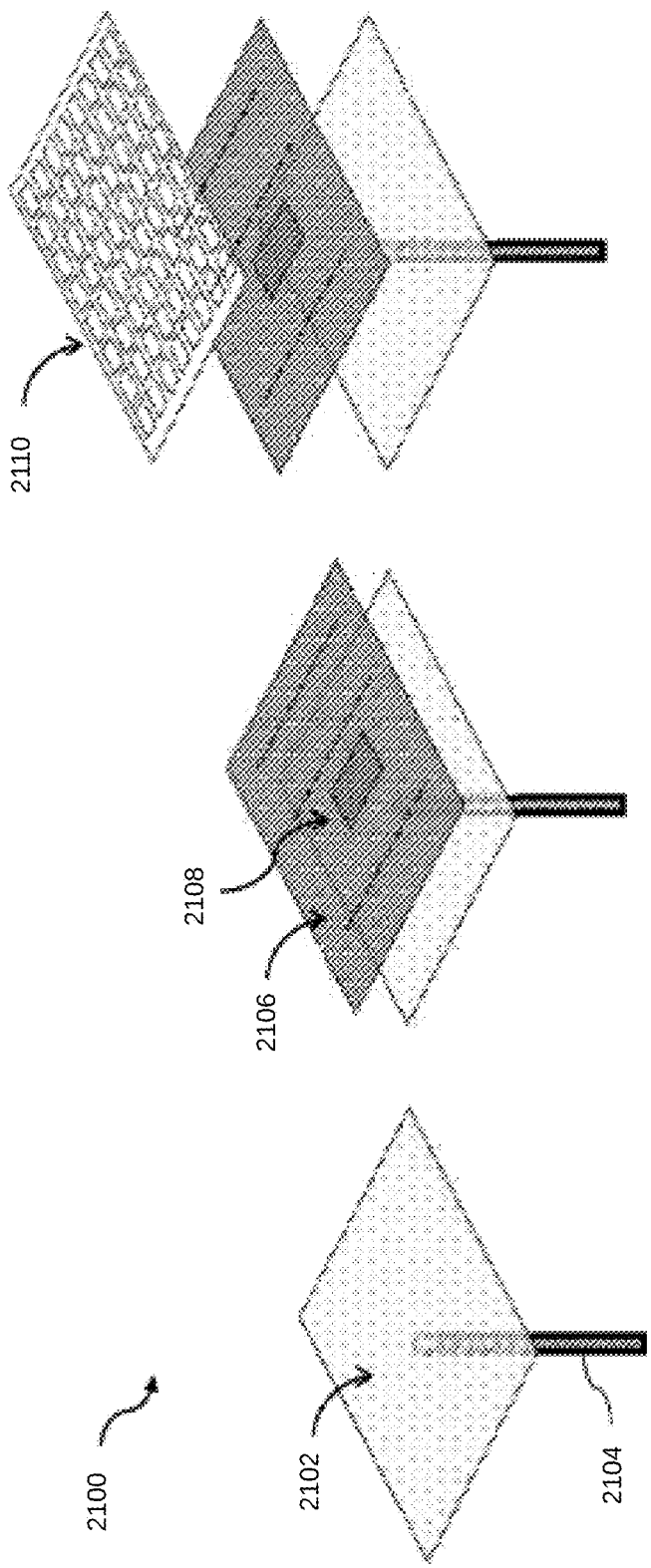
FIGS. 21-22 are schematic diagrams of example iMTM antenna structures.

The iMTM antenna arrays described herein may be fed by a variety of configurations, such as a probe feed or a substrate integrated waveguide and so forth. In one example of a DCiMTM antenna 2100, illustrated in FIG. 21, a signal source is provided as a probe 2104, which may be coupled to a ground plane 2102. The probe 2104 supplies the source signal for the antenna 2100 to generate a modulated EM waveform. A second layer 2106 is positioned over the ground plane 2102. The second layer 2106 is made of a dielectric material and has an antenna structure 2108 configured thereon. This antenna 2108 is designed to receive the source signal and generate a relatively flat wave front to meet the iMTM array 2110. The antenna 2108 may be a dipole antenna or any other antenna capable of generating a relatively uniform and flat wave front across the entirety of the second layer 2106. The ability to provide the signal to the iMTM array or to individual subarrays and/or individual unit cells, enables the DCiMTM antenna 2100 to radiate EM beamforms that are steerable. The iMTM unit cells are controlled by changes to the reactance behavior of the iMTM unit cells, such as through a variable capacitor or varactor(s) within each iMTM cell.

Figure 22:
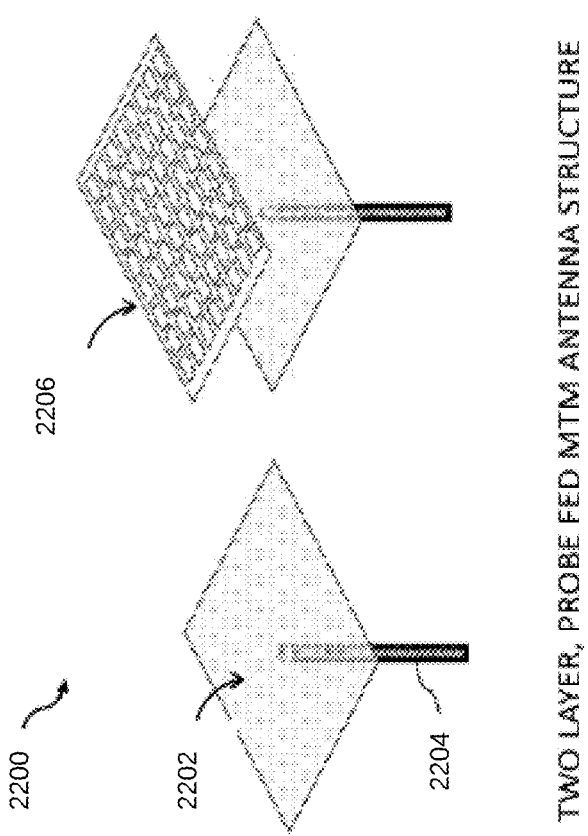

Another example is illustrated in FIG. 22, which is a two-layer, probe fed iMTM antenna structure 2200. As in the example of FIG. 21, a probe 2204 supplies the signal to a ground plane layer 2202. In this example, an iMTM antenna array 2206 is placed over the ground plane with no middle layer. The source signal is distributed across the ground plane 2202 such that a relatively flat wave form is presented to the iMTM antenna array 2206. The iMTM antenna array 2206 then radiates the transmission signal as described herein, wherein each unit cell may transmit individually or transmit as a sub-array.

It is appreciated that the disclosed examples are a dramatic contrast to the traditional complex systems incorporating multiple antennas controlled by digital beam forming. The disclosed examples increase the speed and flexibility of conventional systems, while reducing the footprint and expanding performance.

The iMTM radar system 100 of FIG. 1 may implement the various aspects, configurations, processes and modules described throughout this description. The iMTM radar system 100 is configured for placement in an autonomous driving system (e.g., autonomous driving system 1600 of FIG. 16) or in another structure in an environment (e.g., buildings, bill boards along roads, road signs, traffic lights, etc.) to complement and supplement information of individual vehicles, devices and so forth. The iMTM radar system scans the environment, and may incorporate infrastructure information and data, to alert drivers and vehicles as to conditions in their path or surrounding environment. The iMTM radar system is also able to identify targets and actions within the environment. The various examples described herein support autonomous driving with improved sensor performance, all-weather/all-condition detection, advanced decision-making algorithms and interaction with other sensors through sensor fusion. The iMTM radar system leverages intelligent metamaterial antenna structures and AI techniques to create a truly intelligent digital eye for autonomous vehicles.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An intelligent metamaterial radar, comprising:
an Intelligent Metamaterial ("iMTM") antenna module configured to radiate a transmission signal with a dynamically controllable iMTM antenna in a plurality of directions based on a variable reactance and generate radar data capturing a surrounding environment, the iMTM antenna comprising a plurality of iMTM cells and a plurality of subarrays, wherein different subsets of the plurality of iMTM cells are arranged into different subarrays of the plurality of subarrays; and
an iMTM interface module configured to detect and identify a target in the surrounding environment from the radar data and to control the iMTM antenna module,
wherein the dynamically controllable iMTM antenna is configured to provide a plurality of phase shifts in the transmission signal with the plurality of subarrays, and wherein each iMTM cell of the plurality of iMTM cells provides a phase shift that corresponds to a change in a radiation pattern controlled, at least in part, by an applied voltage to one or more variable reactance parameters of the iMTM cell.

2. The intelligent metamaterial radar of claim 1, wherein the dynamically controllable iMTM antenna comprises an impedance-matched feed network.

3. The intelligent metamaterial radar of claim 2, wherein the impedance-matched feed network comprises a reactance control module.

4. The intelligent metamaterial radar of claim 3, wherein the reactance control module comprises a varactor.

5. The intelligent metamaterial radar of claim 4, wherein the reactance control module comprises a phase shift network, the phase shift network having a distributed varactor network.

6. The intelligent metamaterial radar of claim 1, wherein each iMTM cell in the iMTM array comprises a voltage-controlled reactance device to provide a plurality of phase shifts in the transmission signal based on a change in the applied voltage to one or more variable reactance parameters in one or more of the plurality of iMTM cells.

7. A method for dynamically controlling an Intelligent Metamaterial ("iMTM") antenna in a radar, the method comprising:
- directing the iMTM antenna comprising a plurality of iMTM cells and a plurality of subarrays to radiate RF beams having a plurality of phase shifts with the plurality of subarrays based on a variable reactance, wherein different subsets of the plurality of iMTM cells are arranged into different subarrays of the plurality of subarrays;
- providing, via the iMTM antenna, a plurality of phase shifts in a transmission signal with the plurality of subarrays, wherein each iMTM cell of the plurality of iMTM cells provides a phase shift that corresponds to a change in a radiation pattern controlled, at least in part, by an applied voltage to one or more variable reactance parameters of the iMTM cell;
- receiving reflections from the RF beams that generate radar data about a surrounding environment;
- identifying a target in the surrounding environment from the radar data; and
- determining next actions for the iMTM antenna.

8. The method of claim 7, wherein directing the iMTM antenna to radiate RF beams comprises directing an iMTM antenna array having a plurality of iMTM cells configured into a plurality of subarrays to radiate the RF beams.

9. The method of claim 8, wherein each iMTM cell in the plurality of iMTM cells comprises a reactance control device to control a reactance of each iMTM cell and generate a phase shift based on the controlled reactance.

10. The method of claim 7, wherein directing the iMTM antenna to radiate RF beams comprises controlling a reactance in an impedance-matched feed network in the iMTM antenna to generate a phase shift based on the controlled reactance.

11. The method of claim 10, wherein directing the iMTM antenna to radiate RF beams comprises transmitting the transmission signal through the impedance-matched feed network and a transmission array coupled to the impedance-matched feed network.

12. The method of claim 11, wherein transmitting the transmission signal through the impedance-matched feed network and the transmission array comprises transmitting the transmission signal through a plurality of super elements formed by a plurality of slots in the transmission array.

13. A dynamically controllable Intelligent Metamaterial ("iMTM") antenna, comprising:
- an impedance-matched feed network having a reactance control module;
- a transmission array configured into a plurality of super elements; and
- an iMTM antenna array of iMTM cells comprising a plurality of iMTM cells and a plurality of subarrays that radiates a plurality of RF beams having a plurality of phase shifts in a transmission signal with the plurality of subarrays, wherein different subsets of the plurality of iMTM cells are arranged into different subarrays of the plurality of subarrays,
  - wherein each iMTM cell of the plurality of iMTM cells provides a phase shift that corresponds to a change in a radiation pattern controlled, at least in part, by an applied voltage to one or more variable reactance parameters of the iMTM cell.

14. The dynamically controllable iMTM antenna of claim 13, wherein the reactance control module comprises a varactor.

15. The dynamically controllable iMTM antenna of claim 13, wherein the reactance control module comprises a phase shift network, the phase shift network comprising a distributed varactor network.

16. The dynamically controllable iMTM antenna of claim 13, wherein each super element in the plurality of super elements comprises a plurality of slots in a conductive layer proximate the iMTM cells in the iMTM antenna array.

17. The dynamically controllable iMTM antenna of claim 13, wherein each iMTM cell comprises a reactance control device configured to generate a phase shift according to a reactance of the reactance control device.

18. The dynamically controllable iMTM antenna of claim 17, wherein the reactance control device comprises a varactor.

19. The dynamically controllable iMTM antenna of claim 17, wherein the plurality of phase shifts are generated by the reactance control device in each iMTM cell and the reactance control module, the reactance control device generating a phase shift in a first direction and the reactance control module generating a phase shift in a second direction.

* * * * *